(12) United States Patent
Ali et al.

(10) Patent No.: US 11,581,936 B2
(45) Date of Patent: Feb. 14, 2023

(54) METHOD AND APPARATUS FOR BEAM MANAGEMENT IN ANTENNA ARRAY SHARING RADAR AND COMMUNICATION SYSTEMS

(71) Applicant: Samsung Electronics Co., Ltd., Suwon-si (KR)

(72) Inventors: Anum Ali, Plano, TX (US); Boon Loong Ng, Plano, TX (US); Jianhua Mo, Allen, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/454,478

(22) Filed: Nov. 10, 2021

(65) Prior Publication Data

US 2022/0294511 A1    Sep. 15, 2022

Related U.S. Application Data

(60) Provisional application No. 63/156,029, filed on Mar. 3, 2021.

(51) Int. Cl.
*H04B 7/02* (2018.01)
*H04B 7/06* (2006.01)
*G01S 13/86* (2006.01)

(52) U.S. Cl.
CPC ............ *H04B 7/0695* (2013.01); *G01S 13/86* (2013.01)

(58) Field of Classification Search
CPC .............................. H04B 7/0695; G01S 13/86
(Continued)

(56) References Cited

U.S. PATENT DOCUMENTS 8,130,859 B2    3/2012   Lee et al.
10,871,549 B2   12/2020  Rimini et al.
(Continued)

FOREIGN PATENT DOCUMENTS

JP    2011038730 A    2/2011
KR    10-0813909 B1   3/2008
(Continued)

OTHER PUBLICATIONS

International Search Report and Written Opinion dated May 24, 2022 regarding Application No. PCT/KR2022/002230, 6 pages.
(Continued)

*Primary Examiner* — Zewdu A Kassa

(57) ABSTRACT

An electronic device and methods for performing beam management (BM) in systems with antenna arrays capable of operating in combined radar and communication modes are disclosed herein. The electronic device comprises a processor and a plurality of antenna elements configured to operate in a first mode, in which the antenna elements are used for communications with beamforming, and a second mode, in which at least two of the antenna elements are used for radar and the remainder are used for the communications. The processor is configured to perform a mode switch on the antenna elements to switch between the first mode and the second mode, determine, after the mode switch, a new beam to use during a first BM cycle, perform, using the new beam, the first BM cycle to obtain signal quality measurements, and perform a second BM cycle using an updated beam based on the signal quality measurements.

20 Claims, 18 Drawing Sheets
(1 of 18 Drawing Sheet(s) Filed in Color)

(58) Field of Classification Search
USPC ................ 375/262, 259, 260, 219, 295, 316
See application file for complete search history.

(56) References Cited

U.S. PATENT DOCUMENTS

| | | | |
|---|---|---|---|
| 2009/0102715 A1* | 4/2009 | Lou ..................... | H04B 7/0695 |
| | | | 342/372 |
| 2009/0201194 A1 | 8/2009 | Winkler et al. | |
| 2016/0294462 A1 | 10/2016 | Jeong et al. | |
| 2018/0031673 A1 | 2/2018 | Kim et al. | |
| 2020/0252869 A1 | 8/2020 | Kassa et al. | |
| 2020/0373983 A1 | 11/2020 | Bengtsson et al. | |
| 2021/0034828 A1 | 2/2021 | Pettus | |
| 2021/0111771 A1 | 4/2021 | Ramireddy et al. | |

FOREIGN PATENT DOCUMENTS

| | | |
|---|---|---|
| KR | 10-1010522 B1 | 1/2011 |
| KR | 10-1566622 B1 | 11/2015 |
| KR | 10-1598705 B1 | 3/2016 |

OTHER PUBLICATIONS

5G Americas, "Advanced Antenna Systems for 5G", White Paper, Aug. 2019, 59 pages.

* cited by examiner

Comm. only operation mode

Comm.+radar operation mode

METHOD AND APPARATUS FOR BEAM MANAGEMENT IN ANTENNA ARRAY SHARING RADAR AND COMMUNICATION SYSTEMS

CROSS-REFERENCE TO RELATED APPLICATION(S) AND CLAIM OF PRIORITY

This application claims priority under 35 U.S.C. § 119(e) to U.S. Provisional Patent Application No. 63/156,029 filed on Mar. 3, 2021, which is hereby incorporated by reference in its entirety.

TECHNICAL FIELD

This disclosure relates generally to beam management in wireless communications systems. Embodiments of this disclosure relate to methods and apparatuses for performing beam management in a wireless communications system in which an antenna array is designed for switching between use in a communication-only operation mode and a simultaneous communication and radar operation mode.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage is of paramount importance.

Furthermore, radar and wireless communication are two alternative uses of the electromagnetic spectrum. Almost all consumer electronics have some form of wireless communication, and the use of radar in consumer electronics is increasing. The available resources for these two systems, however, are limited. The spectrum crunch problem that wireless communication systems face is exacerbated when the spectrum is also to be allocated for radar. Consumer electronic devices that are small in size and operate on a battery also have a limited space and power budget. These constraints imply that the limited available resources have to be shared between wireless communication and radar, both for co-existence of these systems and their joint design.

SUMMARY

Embodiments of the present disclosure provide a method and an apparatus for performing beam management (BM) in systems with antenna arrays capable of operating in combined radar and communication modes.

In one embodiment, an electronic device is provided, comprising a plurality of antenna elements and a processor. The plurality of antenna elements are configured to operate in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming. The processor is configured to perform a mode switch on the plurality of antenna elements to switch between operation in the first mode and the second mode, determine, after the mode switch is performed, a new beam to use for the communications during a first beam management cycle after the mode switch, perform, using the new beam, the first beam management cycle on the plurality of antenna elements after the mode switch to obtain signal quality measurements, and perform at least one second beam management cycle on the plurality of antenna elements after the first beam management cycle, using an updated beam that is determined based on the signal quality measurements obtained during the first beam management cycle.

In another embodiment, a method performed by an electronic device is provided. The method includes performing a mode switch on a plurality of antenna elements to switch between operation in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming. The method further includes determining, after the mode switch is performed, a new beam to use for the communications during a first beam management cycle after the mode switch, performing, using the new beam, the first beam management cycle on the plurality of antenna elements after the mode switch to obtain signal quality measurements, and performing at least one second beam management cycle on the plurality of antenna elements after the first beam management cycle, using an updated beam that is determined based on the signal quality measurements obtained during the first beam management cycle.

In another embodiment, a non-transitory computer-readable medium is provided. The non-transitory computer-readable medium is configured to store instructions that, when executed by a processor, cause the processor to perform a mode switch on a plurality of antenna elements to switch between operation in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming. The instructions further cause the processor to determine, after the mode switch is performed, a new beam to use for the communications during a first beam management cycle after the mode switch, perform, using the new beam, the first beam management cycle on the plurality of antenna elements after the mode switch to obtain signal quality measurements, and perform at least one second beam management cycle on the plurality of antenna elements after the first beam management cycle, using an updated beam that is determined based on the signal quality measurements obtained during the first beam management cycle.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
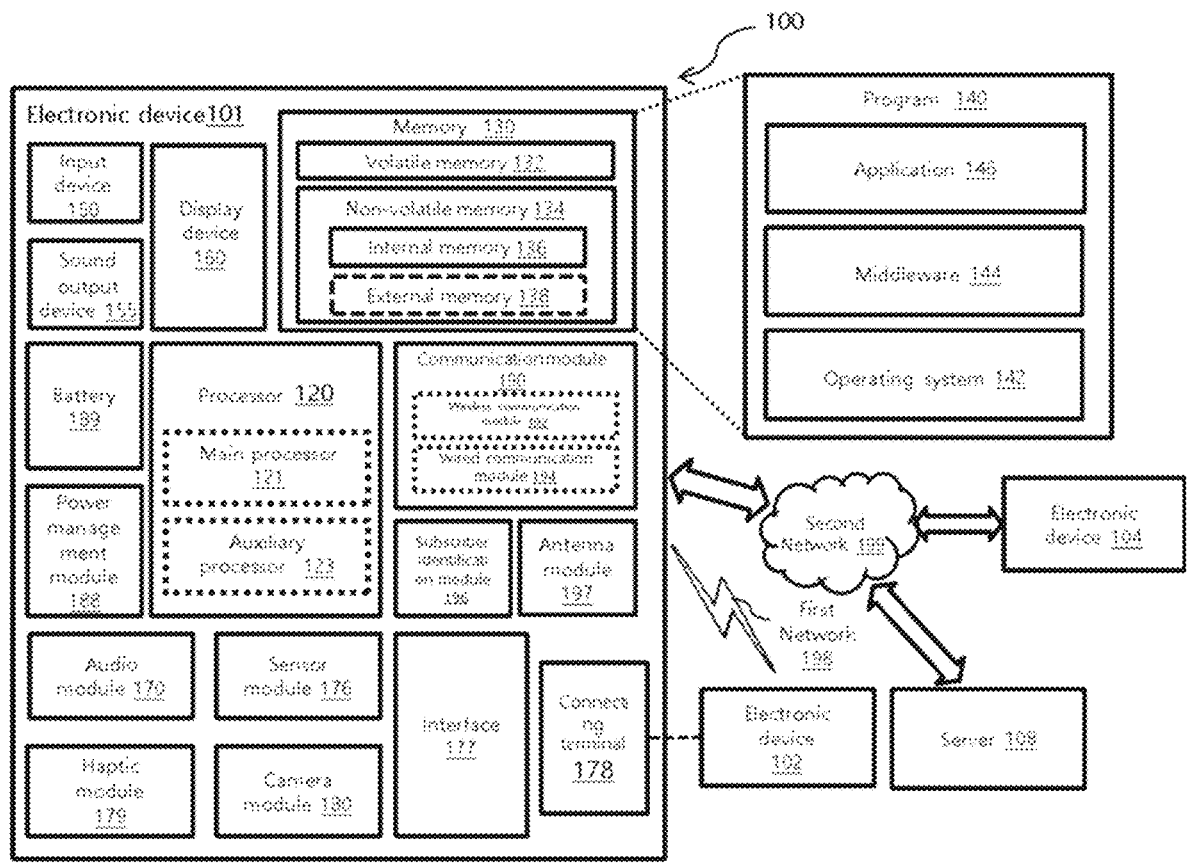
FIG. 1 illustrates an example electronic device in a network environment according to various embodiments of the present disclosure.

FIGS. 1 through 13F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented to include higher frequency (mmWave) bands, such as 28 GHz or 60 GHz bands or, in general, above 6 GHz bands, so as to accomplish higher data rates or, in lower frequency bands, such as below 6 GHz, to enable robust coverage and mobility support.

The present disclosure relates generally to 5G wireless communication systems. Aspects of the present disclosure may also be applied to deployment of 5G communication system, 6G or even later release which may use terahertz (THz) bands. A communication system includes a downlink (DL) that conveys signals from transmission points such as base stations (BSs), eNodeBs (eNBs), or gNodeBs (gNBs) to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology. To decrease propagation loss of the radio waves and increase the transmission distance, beamforming, massive multiple-input multiple-output (MIMO), full dimensional MIMO (FD-MIMO), array antenna, and analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Depending on the network type, the term "base station" or "BS" can refer to any component (or collection of components) configured to provide wireless access to a network, such as transmit point (TP), transmit-receive point (TRP), an enhanced base station (eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/h/g/n/ac, etc. For the sake of convenience, the terms "BS" and "TRP" are used interchangeably in this disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this disclosure to refer to remote wireless equipment that wirelessly accesses a BS, whether the UE is a mobile device (such as a mobile telephone or smartphone) or is normally considered a stationary device (such as a desktop computer or vending machine).

A 5G terminal or UE can be equipped with multiple antenna elements. There can also be one or more antenna modules fitted on the terminal, where each module can include one or more antenna elements. Beamforming is an important factor when a UE tries to establish a connection with a BS. To compensate for the narrower analog beamwidth in mmWave, analog beam sweeping can be employed to enable wider signal reception or transmission coverage for the UE.

Figure 3:
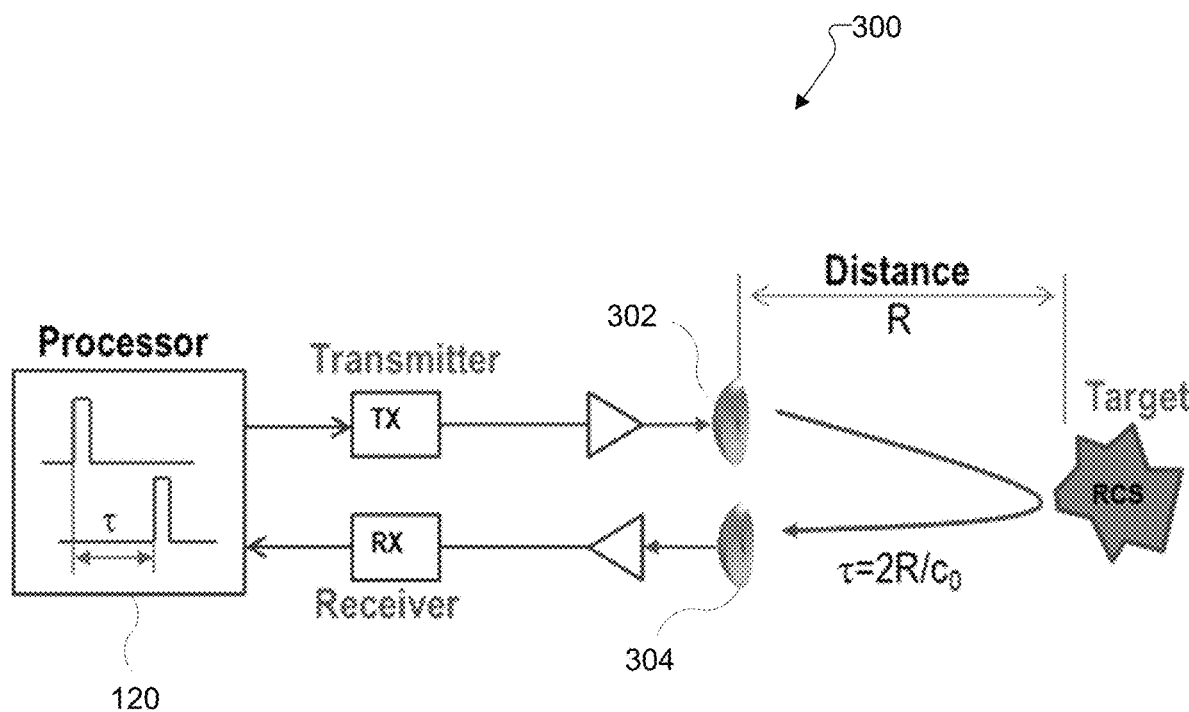
FIG. 3 illustrates an an example monostatic radar architecture according to embodiments of the present disclosure.

A 5G terminal or UE can also be equipped with radar. A common type of radar is the "monostatic" radar, characterized by the fact that the transmitter of the radar signal and the receiver for its delayed echo are, for all practical purposes, in the same location. FIG. 3, discussed further below, illustrates the high level architecture of a monostatic radar. The transmitter and receiver are either co-located (by using a common antenna) or nearly co-located (using separate, but adjacent antennas). Monostatic radars are assumed coherent, i.e., the transmitter and receiver are synchronized via a common time reference.

Embodiments of the present disclosure recognize that beamforming is an important factor when a UE tries to establish a connection with a BS in mmWave systems. To compensate for the narrower analog beamwidth in mmWave, analog beam sweeping can be employed to enable wider signal reception or transmission coverage for the UE. A beam codebook comprises a set of codewords, where a codeword is a set of analog phase shift values, or a set of amplitude plus phase shift values, applied to the antenna elements within an antenna module (or panel), in order to form an analog beam.

Embodiments of the present disclosure further recognize that in a 5G terminal or UE that is equipped with multiple antenna elements and radar, due to limited space, it is beneficial to design one antenna array for radar and communication systems instead of two arrays with one dedicated for each system. Depending on the requirement of the device at any given time, the 5G terminal or UE can switch from a communication-only operation mode to a communication plus radar operation mode (wherein the radar and communication operate simultaneously), or vice versa. When the radar and communication operate simultaneously, the set of antenna elements for radar and the set of antenna elements for communication may or may not be different The process of changing from communication-only operation mode to communication plus radar operation mode, or the other way around, is herein referred to as "mode switching." Mode switching has implications on the communication system's beam management (BM) operation. Beam management is the processing of selecting and maintaining a useful beam (or beams) for transmission and reception of the communication signals. The beams are formed by applying carefully chosen weights on communication antenna elements. After mode switching, the communication antenna elements change, and using the same weights as before the mode switching docs not guarantee the same, or even similar, beam pattern as before the mode switching.

Accordingly, embodiments of the present disclosure provide beam management strategies that include determining a suitable beam to use for the first beam management cycle after a mode switch, so that signal quality measurements can be obtained in the first beam management cycle. Subsequently, conventional beam management cycles can be performed using the measurements obtained in the first beam management cycle.

The embodiments in this disclosure apply to radar and communication systems operating at any frequency. That said, as beamforming through multiple antennas is typically used at higher frequencies (e.g., mmWave, sub-THz, and THz) the embodiments herein are more likely to be used at higher frequencies. Furthermore, the embodiments in this disclosure apply to cases in which the radar and communication systems operate using frequency spectrum that completely overlaps, partially overlaps, is adjacent, or even is separated. For cases in which the spectrum of radar and communication system is such that simultaneous operation creates interference, some interference avoidance/mitigation strategy may be beneficial.

FIG. 1 illustrates an example electronic device 101 in a network environment 100 according to various embodiments of the present disclosure. In this embodiment, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In some embodiments, some of the components may be implemented as a single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101 instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data from the outside (e.g., from a user) of the electronic device 101, to be used by another component (e.g., the processor 120) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for incoming calls. According to an embodiment, the receiver may be implemented separate from or as part of the speaker.

The display device 160 may visually provide information to the outside (e.g., to a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force induced by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a luminance sensor, a blockage sensor, or a folding state sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, WI-FI DIRECT, Ultra-WideBand (UWB), or INFRARED DATA ASSOCIATION (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside of the electronic device 101 (e.g., to or from an external electronic device). According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to an embodiment, the electronic device 101 may include multiple antenna modules 197. Each antenna module 197 can have multiple antennas, referred to as antenna elements, configured such that the antenna module 197 is capable of beamforming using the multiple antenna elements. Furthermore, each antenna module 197 may be configured such that some of the antenna elements may be used for radar operation while the remainder of the antenna elements are capable of beamforming for communication operation at the same time.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. In various embodiments, the electronic device 101 may be a 5G UE or a 5G BS. It is understood that the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., GOOGLE PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
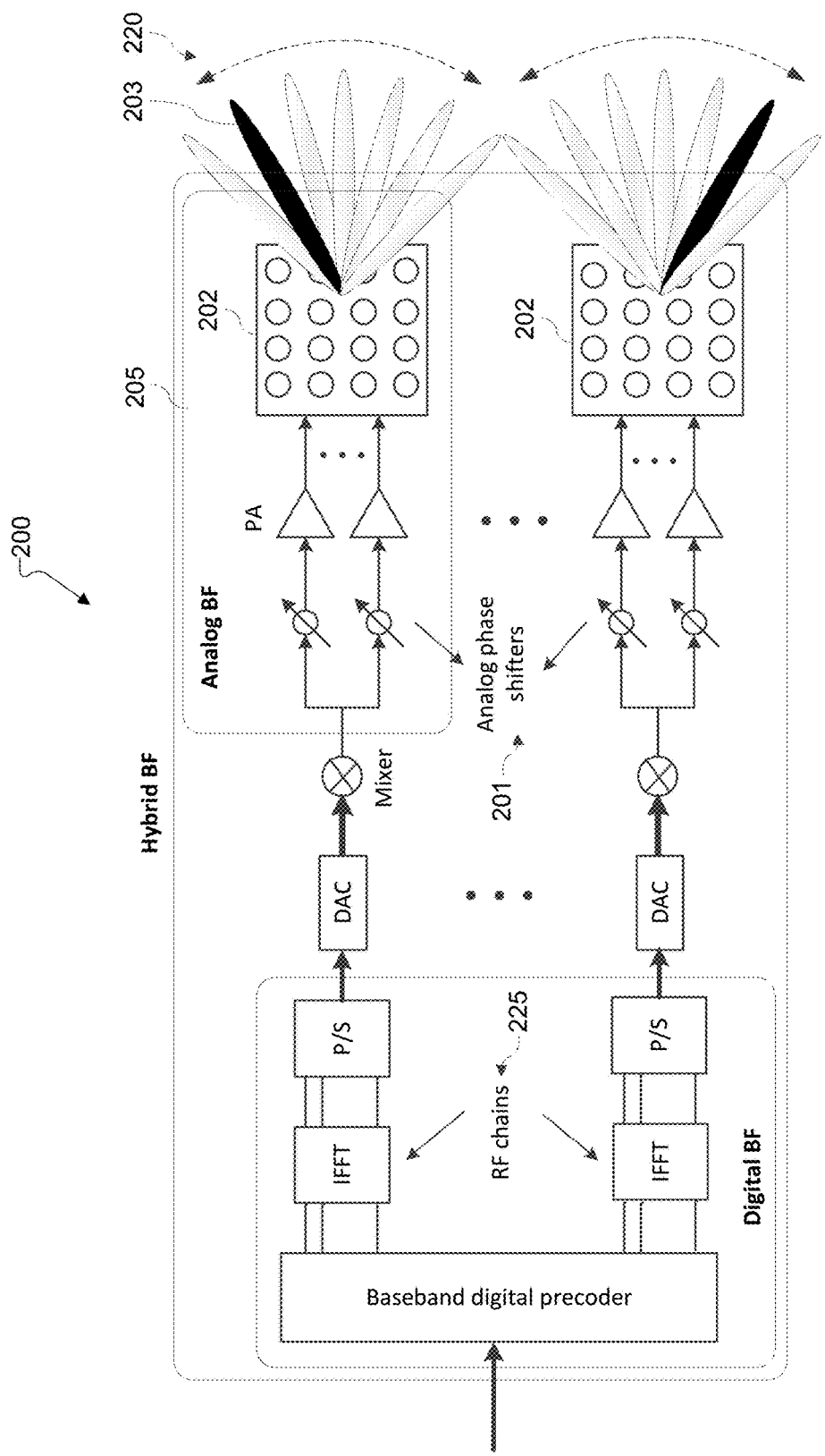
FIG. 2 illustrates a block diagram of example hybrid beamforming (BF) hardware according to embodiments of the present disclosure.

FIG. 2 illustrates a block diagram of example hybrid beamforming (BF) hardware 200 according to embodiments of the present disclosure. The hybrid BF hardware 200 is implemented in the electronic device 101 of FIG. 1. For the purposes of this disclosure, embodiments will be discussed wherein the electronic device 101 is a UE and wherein the electronic device 101 is a BS. However, it is understood that any other beamforming-capable wireless communication device could include hybrid BF hardware 200.

For mmWave band devices, although the number of antenna elements can be large for a given form factor, the number of digitally precoded ports—which can correspond to the number of digital RF chains 225—tends to be limited due to hardware constraints (such as the feasibility of installing a large number of ADCs or DACs at mmWave frequencies) as illustrated in FIG. 2.

In this case, one digital RF chain 225 is mapped onto a large number of antenna elements which can be controlled by a bank of analog phase shifters 201. One digital RF chain 225 can then correspond to one antenna sub-array 202 (which could correspond to an antenna module 197) which produces a narrow analog beam 203 through analog beamforming 205. This analog beam 203 can be configured to sweep across a wide range of angles 220 by varying the phase shifter bank 201 across a transmission time interval.

A BS could utilize one or multiple transmit beams to cover the whole area of one cell. The BS may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for BS to provide coverage with a single transmit beam, i.e., to ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the BS may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the BS may form receive beams.

To assist the UE in determining its receive and/or TX beam, a beam sweeping procedure is employed consisting of the BS transmitting a set of transmit beams to sweep the cell area and the UE measuring the signal quality on different beams using its receive beams. To facilitate candidate beam identification, beam measurement and beam quality reporting, the BS configures the UE with one or more reference signal (RS) resources (e.g., SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the BS configures the UE with one or more Transmission Configuration Indicator (TCI) states for reception of PDCCH and/or PDSCH.

Although FIG. 2 illustrates one example of hybrid BF hardware 200, various changes may be made to FIG. 2. For example, various components in FIG. 2 could be combined, further subdivided, or omitted and additional components could be added according to particular needs.

FIG. 3 illustrates an an example monostatic radar architecture 300 according to embodiments of the present disclosure. The monostatic radar architecture 300 is implemented in the electronic device 101 of FIG. 1. For the purposes of this disclosure, embodiments will be discussed wherein the electronic device 101 is a UE and wherein the electronic device 101 is a BS. However, it is understood that any other wireless communication device could include monostatic radar architecture 300.

In this example, the transmitter 302 and receiver 304 are either co-located (e.g., using a common antenna) or nearly co-located (e.g., using separate, but adjacent antennas). For example, the transmitter 302 and 304 could be implemented using one antenna element of an antenna module 197 (or one antenna element of an antenna sub-array 202), or using two adjacent antenna elements of an antenna module 197 (or two adjacent antenna elements of an antenna sub-array 202). As discussed above, the monostatic radar is coherent, i.e., the transmitter 302 and receiver 304 are synchronized via a common time reference.

Although FIG. 3 illustrates one example of monostatic radar architecture 300, various changes may be made to FIG. 3. For example, various components in FIG. 3 could be combined, further subdivided, or omitted and additional components could be added according to particular needs.

In a generalization of the embodiments discussed herein below, an antenna array is understood to refer to the antenna module 197 in an electronic device 101, and it is defined that there are a total of N antenna elements in an antenna array. The number of antenna elements used by the communication system, and called "communication antenna elements," is designated $N_c$, and the number of antenna elements used by the radar system, and called "radar antenna elements," is designated $N_r$. Two modes of operation are considered, namely "communication only" (or in short "comm. only") mode, and "communication plus radar" (or in short "comm.+radar") mode.

As the name implies, in comm. only mode, only the communication functionality is activated. Specifically, in a first example, all N antennas are used by the communication system, (i.e., $N_c$=N). In comm.+radar mode, 0<$N_c$<N antennas are used by the communication system, and 0<$N_r$<N antennas are used by the radar system, such that $N_c$+$N_r$=N. In a second example, it is also possible that 0<$N_{c1}$<N antennas are used by the communication system in comm. only mode, 0<$N_{c2}$<N antennas are used by the communication system in comm.+radar mode, where $N_{c1}$≠$N_{c2}$ and $N_{c2}$+$N_r$=N. Without loss of generality, the first example is assumed herein below for ease of explanation.

As discussed above, depending on the requirement of the UE at any given time, the UE can switch from comm. only operation mode to comm.+radar operation mode, or vice versa. The process of changing from comm. only mode to comm.+radar mode, or the other way around, is called "mode switching," and mode switching has implications on the communication system's beam management (BM) operation. For example, after mode switching, the communication antenna elements change, and using the same weights as before the mode switching does not guarantee the same, or even similar, beam pattern as before the mode switching.

Figures 4, 5:
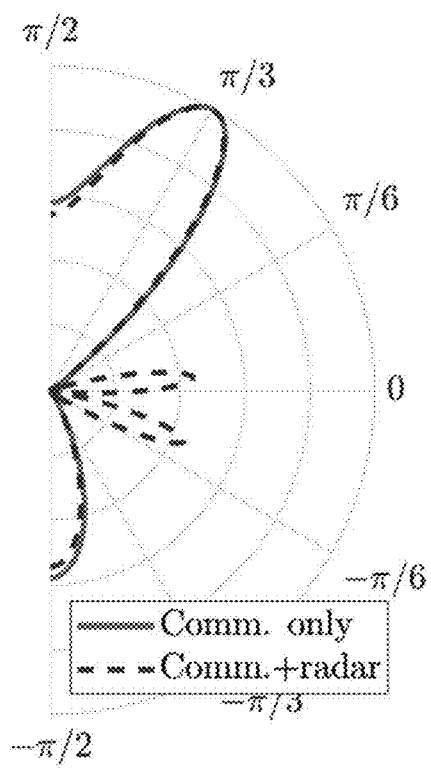
FIG. 4 illustrates an example scenario of changing beam pattern with mode switching according to embodiments of the present disclosure.
FIG. 5 illustrates a beam pattern of the communication only operation mode and of the communication plus radar operation mode in the scenario of FIG. 4.

FIG. 4 illustrates an example scenario of changing beam pattern with mode switching according to embodiments of the present disclosure. The scenario of FIG. 4 is based on antenna element assignments in a uniform linear array (ULA) with N=6 antenna elements that are spaced apart by a half wavelength. In this example scenario, in comm. only mode, $N_c$=6, and in comm.+radar mode, $N_c$=4 and $N_r$=2 (i.e., one transmit antenna and one receive antenna for radar operation) are used. More specifically, in comm.+radar mode, antenna elements 2 and 5 are used by the radar system.

A beam weight vector (i.e., a vector in which each entry is a weight applied to the signal at one of the antenna elements) for comm. only mode in this example is obtained by matching the array response vector of a six element half wavelength spacing ULA to a source at $$\frac{\pi}{3}$$

radians. The resulting beam pattern is illustrated in FIG. 5. FIG. 5 also illustrates the beam pattern of the communication system in the comm.+radar operation mode. In comm.+radar mode in this example, the same weight vector as for the comm. only mode is used, except that the weights for antenna elements 2 and 5 are set to zero.

In this example, the beam patterns of the comm. only and comm.+radar operation modes are normalized to have maximum gain of the beam pattern equal to one. As $N_c$=6 for comm. only mode and $N_c$=4 for comm.+radar mode, without normalization the communication system's maximum beam gain is not identical. Normalization is done to have equal beam gains so that the differences in beam shape can be focused on, and the example is not obfuscated by different beam gains. It can be seen from FIG. 5 that although the main beam shapes and coverage are very similar for both comm. only and comm.+radar modes, there are strong side lobes for the comm.+radar mode.

The beam patterns illustrated in FIG. 5 imply a problem with beam management after mode switching. As the communication antenna elements and the resulting beam pattern changes with mode switching, the beam management process will be disrupted. Specifically, in comm. only mode, the beam management process would have found a suitable beam for the communication system, depending on some criterion (e.g., the beam that maximizes the reference signal received power (RSRP), signal-to-interference-and-noise ratio (SINR), signal-to-noise ratio (SNR), or reference signal received quality (RSRQ), etc.). The system designer uses a specific weight vector to obtain the beam. However, when the mode switches to comm.+radar mode, and the set of communication antenna elements changes, the same weight vector (with the weights of the radar antenna elements set to zero) will result in a different beam in the communication system.

Accordingly, there is no guarantee that using the same weight vector after mode switching will give the optimal beam. The new beams, after mode switching, need to be measured, (i.e., a metric of signal quality, be it RSRP, SINR, SNR, or RSRQ, need to be obtained on all beams) before the optimal beam post mode switch can be determined. The time it takes to measure the signal quality metric for all the new beams (e.g., using the beam sweeping procedure discussed above) is called the beam management cycle. Yet, until the first beam management cycle completes, some beam still needs to be used for the communication. The choice of which beam is used for communication in the first beam management cycle determines whether the beam management process is disrupted after the mode switch. If the beam in the first beam management cycle is not chosen carefully, it can result in lost throughput in the first beam management cycle, or, in the worst case, even a broken communication link in the first beam management cycle.

The various embodiments below deal with lowering (or, preferably, minimizing) the impact on beam management when the operation mode switches between comm. only and comm.+radar modes. The embodiments include methods to design the codebooks and/or to use the current RSRP table in order to minimize the disruption on the communication link during the first beam management cycle. For simplicity, RSRP is used herein below as a metric of signal quality, but other metrics of signal quality (e.g., SNR, SINR, and RSRQ) can also be used. The embodiments provide a reliable communication link after the mode switch by choosing a suitable beam in the first beam management cycle, and avoid throughput loss or a broken communication link in the first beam management cycle. Subsequently, after one beam management cycle is finished, the best beam can be determined in a conventional manner (e.g., as the beam that provides the highest metric of signal quality based on measurements performed in the first beam management cycle). If the selection of the best beam post-switch is good, the throughput before one beam management cycle is completed (i.e., the phase in which a beam that is selected based on the methods of this disclosure is being used), and after one beam management cycle is completed (i.e., the phase in which a beam that can be selected based on conventional beam management is being used), will be similar.

Figure 6:
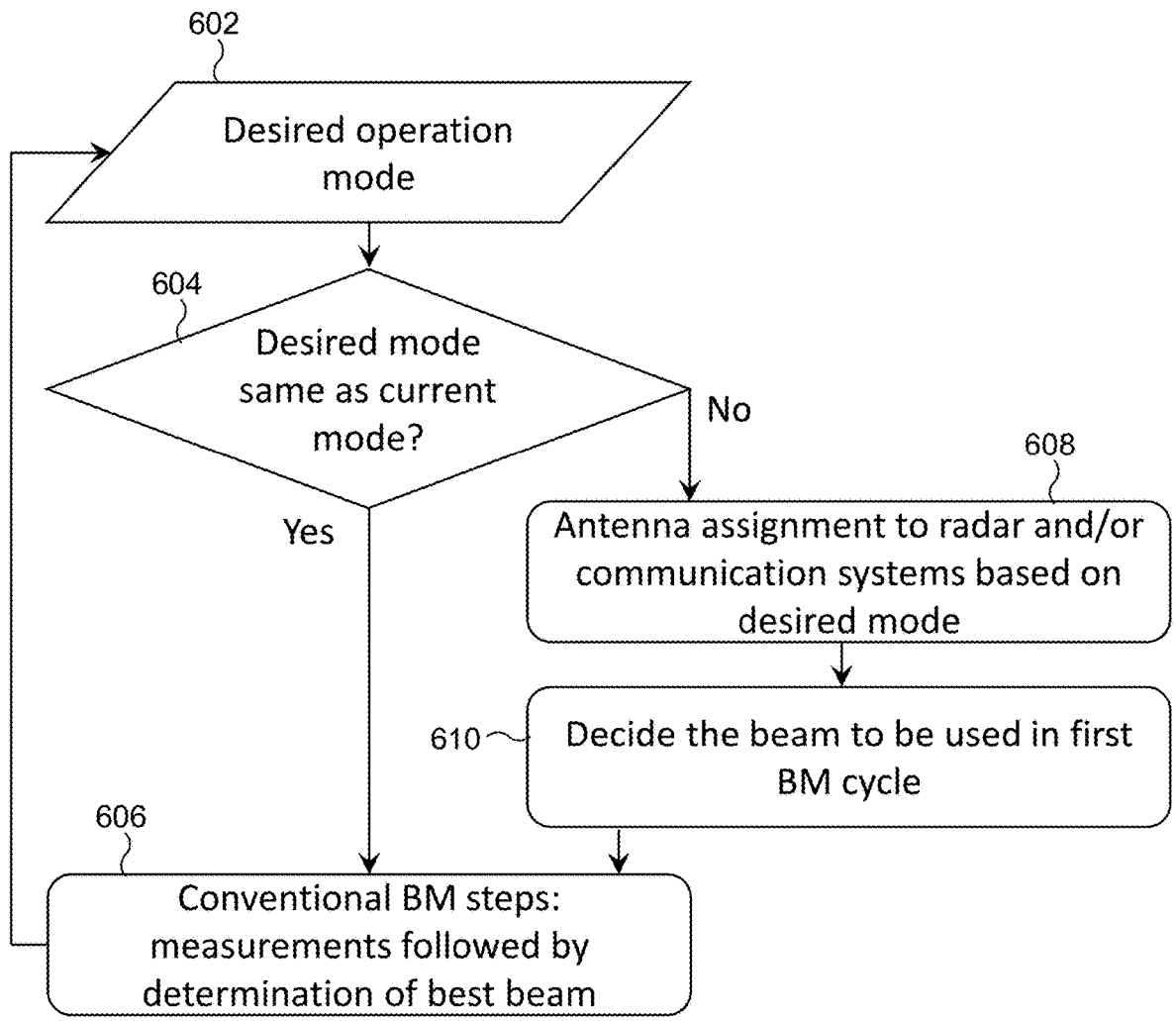
FIG. 6 illustrates an overall process for beam management in an antenna array sharing radar and communication systems in an electronic device according to embodiments of the present disclosure.

FIG. 6 illustrates an overall process for beam management in an antenna array sharing radar and communication systems in an electronic device 101 according to embodiments of the present disclosure. The antenna array can be an antenna module 197. For the purposes of this disclosure the electronic device 101 will be discussed as a UE, but it is understood that it could be any suitable wireless communication device.

First, an input is received from higher layers that indicates the desired operation mode, e.g., whether to continue with the current mode, be it comm. only or comm.+radar, or to switch the mode (step 602). Here the higher layers are the higher layers of the Open Systems Interconnection (OSI) model above the physical layer. Specifically, the higher layers could abstract the current data rate requirement into multiple levels and indicate the current level to the PHY layer. The input from higher layers is an example, and in some embodiments it is also possible that the decision on the mode is made by the modem. For example, if the radar operation is designed to facilitate communication operation (or vice versa), implying the need for tighter integration of radar and communication operations.

The desired operation mode can be decided at any time by the higher layers (or by the modem), and is a function of what level of performance needs to be supported for the communication system and whether the radar operation is required or not. The required performance of the communication system can be determined, e.g., from the data rate required to support the application that is being used. To be specific, if the user is streaming videos or playing online games, it may be desirable to support a high data rate (e.g., on the order of tens of mega-bytes per second (MBps)), whereas if the user has an email application open or is making a voice call, the required data rate may not be high (e.g., on the order of hundreds of kilo-bits per second (kbps)). When there is high data rate requirement, it may be preferable to allocate all antennas to the communication system (i.e., to operate in comm. only mode), and when the data rate requirement is low, comm.+radar operation may be supported. Therefore, depending on the current application being used (and its required data rate) and whether the radar operation needs to be supported, the higher layers can determine whether the operation mode should be comm. only or comm.+radar.

Next, at decision block 604, the desired mode of operation is compared to the current mode of operation. If the desired mode of operation is the same as current mode of operation, the antenna assignment will not change. Therefore, the conventional beam management process can continue with the current codebook at step 606. The simplest form of conventional beam management is to sequentially measure RSRP on one or more beams in order to fill and update an RSRP table. The best beam is then decided based on this RSRP table, e.g., the best beam may be the beam that has the highest RSRP.

If the desired mode of operation is not the same as the current mode of operation, then depending on the current mode of operation, the antenna elements of the antenna array can be assigned to the communication or radar systems at step 608. As the desired mode is not the same as the current mode, the desired antenna assignment will be different from the current antenna assignment.

In this disclosure, it is assumed that in comm. only mode all N antennas are assigned to the communication system, i.e., $N_c=N$, and in comm.+radar mode, $0<N_c<N$ antennas are used for the communication system, and $0<N_r<N$ antennas are used for the radar system, where $N_c+N_r=N$. In addition to deciding the number of antennas for communication and radar in comm.+radar mode, there is flexibility in assigning the sets of antennas to the communication and radar systems. Different antenna assignments can favor the radar or communication operation, even with fixed $N_c$ and $N_r$. As an example, given a fixed number of antennas for radar, it may be desirable to assign antenna elements to form a sparse array, e.g., a minimum redundancy array. This choice may be preferable over uniform antenna assignment with half wavelength spacing in order to improve angle estimation accuracy. Once the $N_r$ antennas to be used for the radar system are determined, the remaining $N-N_r=N_c$ antennas can be assigned to the communication system.

Alternatively, the $N_c$ antennas for the communication system can be decided first, in order to optimize the performance of the communication system. For communication systems, it may be desirable to have a uniform layout of an antenna array, typically with half wavelength spacing. Once $N_c$ uniformly spaced antennas are assigned to the communication system, then the remaining $N-N_c=N_r$ antennas are assigned to the radar system. The assignment of antennas for communication and radar may also be jointly made, e.g., by selecting antennas to optimize communication performance under the constraint that the selection doesn't violate some performance requirement of the radar system (e.g., maximizing throughput while keeping false detection rate below a certain threshold), or by selecting antennas to optimize radar performance under the constraint that the selection doesn't violate some performance requirement of the communication system (e.g., minimizing the false detection rate while keeping throughput above a threshold).

By using switches, it is possible to switch between the aforementioned layouts—i.e., one in which antennas are first assigned to the radar system to optimize its performance (and the remaining antennas are assigned to the communication system), one in which antennas are first assigned to the communication system to optimize its performance (and the remaining antennas are assigned to the radar system), and one with joint selection. Having a fixed layout or antenna assignment, however, is simpler and is easier to implement. For ease of explanation, this disclosure focuses primarily on fixed assignment, and in alternative embodiments the case when the assignment is not fixed is discussed. Nevertheless, whenever the UE switches between comm. only and comm.+radar modes, the beam for communication in the first beam management cycle after mode switch needs to be carefully chosen in order to minimize disruption in beam management process.

Accordingly, after the mode switch, and before the first beam management cycle is completed, a suitable beam is selected at step 610 to avoid disrupting the beam management process. Various embodiments of this disclosure that provide detailed methods for making this selection will be discussed herein below. Once the first beam management cycle is completed, the conventional beam management steps, i.e., RSRP measurements followed by appropriate beam selection, can continue at step 606.

Figure 7:
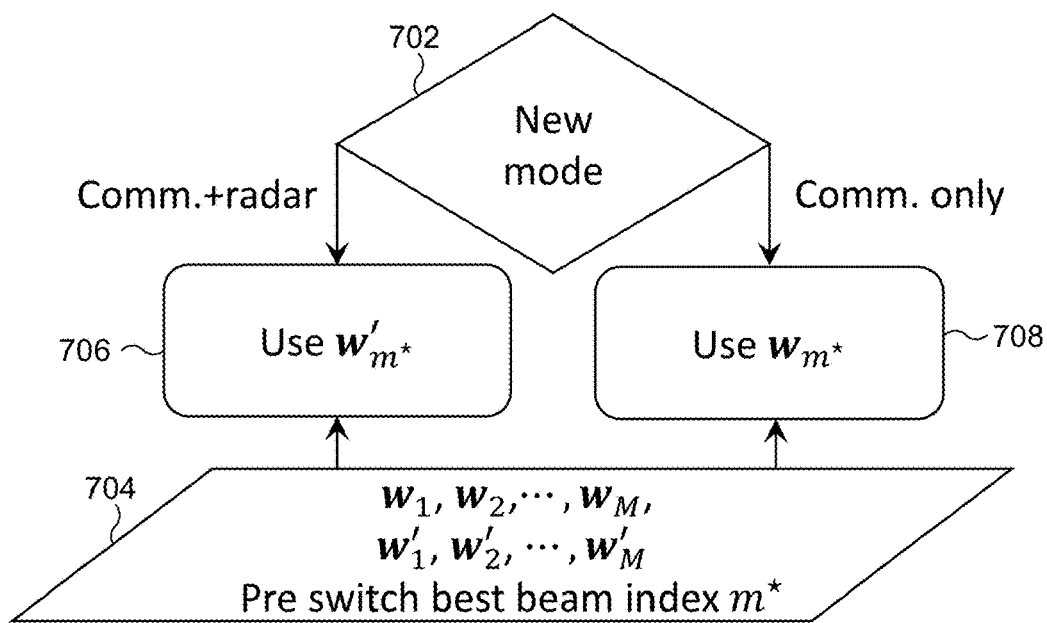
FIG. 7 illustrates an example process for selecting a suitable beam after the mode switch using a selection vector according to embodiments of the present disclosure.

FIG. 7 illustrates an example process for selecting a suitable beam after the mode switch using a selection vector according to embodiments of the present disclosure. For the purposes of this disclosure the process of FIG. 7 will be discussed as an embodiment of step 610 of FIG. 6, but it is understood that this process could be used in any suitable beam management process.

In one embodiment, there are M codewords designed for the comm. only operation mode. Each codeword is an N dimensional weight vector. For example, the $m^{th}$ codeword is $w_m \in C^{N \times 1}$. The $i^{th}$ entry of the vector $w_m[i]$ is a complex number representing the phase and/or magnitude to be applied to the $i^{th}$ antenna element of the antenna array to obtain the desired beam pattern. These codewords can be obtained, e.g., to maximize the spherical coverage of the resulting beam patterns for the comm. only operation mode. For purposes of this disclosure, it is assumed that the codewords are pre-determined and known to the electronic device 101.

After a mode switch to comm.+radar operation mode, to obtain weight vectors for the comm.+radar operation mode, an N dimensional vector s is defined. Let the indices of communication antenna elements be collected in a set $N_c$, and let the indices of radar antenna elements be collected in a set $N_r$. The entries of s corresponding to indices in $N_c$ are set to one, whereas the entries of s corresponding to indices in $N_r$ are set to zero. The weight vector associated with the $m^{th}$ codeword for the comm.+radar operation is then obtained as $w_m' = w_m \odot s$, where $\odot$ represents the Hadamard or element-wise product. This operation will set the weight of radar antenna elements to zero, whereas it will retain the weight of communication antenna elements from the comm. only operation. The vector s can be thought of as a selection vector, and thus this strategy may be referred to as a selection vector based strategy.

If the weight vectors are chosen according to this strategy, then the process illustrated in FIG. 7 can be used for deciding the beam to use in the first beam management cycle after a mode switch. It is assumed that the $m^{*th}$ beam is known to be the best beam pre-mode switch ($m^*$ is the index of the best beam pre-mode switch, i.e., the index of the codeword of the best beam pre-mode switch). Here, the "best beam" could mean the beam that maximizes some metric of signal quality, e.g., RSRP. The index of the best beam pre-mode switch is obtained by conventional beam management, e.g., by receiving the transmitted reference signals on all the beams in a round robin manner, and setting $m^*$ to be the index of the beam that has the highest RSRP.

At step 702, a mode switch is performed. This could correspond to step 608 of FIG. 6. Given that $m^*$ is known pre-mode switch (represented by information 704), then the weight vector to be used after the switch is $w_{m^*}$ while switching from comm.+radar to comm. only mode (step 706), and it is $w'_{m^*} = w_{m^*} \odot s$ while switching from comm. only to comm.+radar mode (step 708).

An example of resulting beam patterns using this strategy is illustrated in FIG. 5. Thus, when switching to comm.+radar mode, this strategy can result in a main lobe that is similar to the main lobe of the beam pattern used for comm. only operation. However, there are higher side lobes which, as noted above, may be a problem, The problem of these side lobes can be tolerated (in other words, the selection vector based strategy is feasible for implementation), if certain conditions hold.

Figure 8:
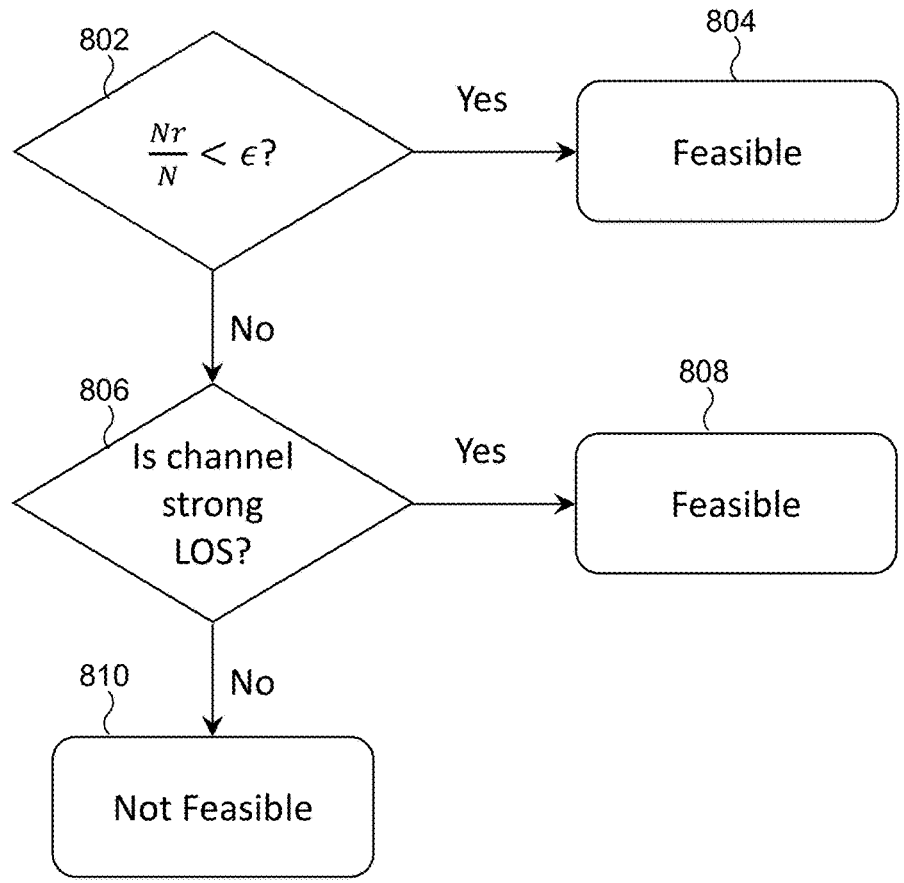
FIG. 8 illustrates an example of testing the feasibility of the selection vector based strategy of FIG. 7.

The feasibility of the selection vector based strategy of FIG. 7 can be tested as illustrated in FIG. 8. The side lobes increase when a portion of the antenna elements are used for the radar operation. If the fraction of radar antenna elements $$\left(\text{i.e., } \frac{N_r}{N}\right)$$

is small, then the side lobes will be considerably weaker than the main lobe. As such, the side lobes can be ignored, and the proposed selection vector based strategy is feasible (determination 804). This situation can be characterized as the situation where $$\frac{N_r}{N} < \epsilon$$

(decision block 802), where $\epsilon$ is a small positive number (e.g., 0.05-0.2).

A second, alternative condition is related to the channel state. A line-of-sight (LOS) channel is a channel in which a certain fraction (a typical rule of thumb is 80%) of the first Fresnel zone between the transmitter and receiver is clear. A strong LOS channel is a channel in which the non-line-of-sight (NLOS) paths are considerably weaker as compared to the LOS path. If the channel is strong LOS, then it is likely that the beam with highest RSRP has the LOS path in its main lobe. As the selection vector based strategy of FIG. 7 does not change the main lobe, then if there is a strong LOS channel (decision block 806), it is highly likely that if the $m^{*th}$ beam was the best beam pre-mode switch, the $m^{*th}$ beam will still be the optimal beam post-mode switch—i.e., the selection vector based strategy is feasible (determination 808).

In practice, the RSRP distribution across beams can inform whether the channel is strong LOS or not. If one beam has considerably higher RSRP compared to others, it is a good indication of a strong LOS channel. It is, however, possible to have a strong LOS channel yet have higher RSRP on more than one beam (e.g., when the angle-of-arrival (AoA) falls at the boundary region of the two consecutive beams, or when beams are tightly packed). In such scenarios, sophisticated LOS determination strategies can be used, e.g., tracking RSRP across time and beams. If none of the above conditions is satisfied, then it may be determined that the selection vector based strategy is not feasible (determination 810), and some strategy other than the selection vector based strategy should be used (e.g., one of the subsequent strategies in this disclosure).

Figure 9:
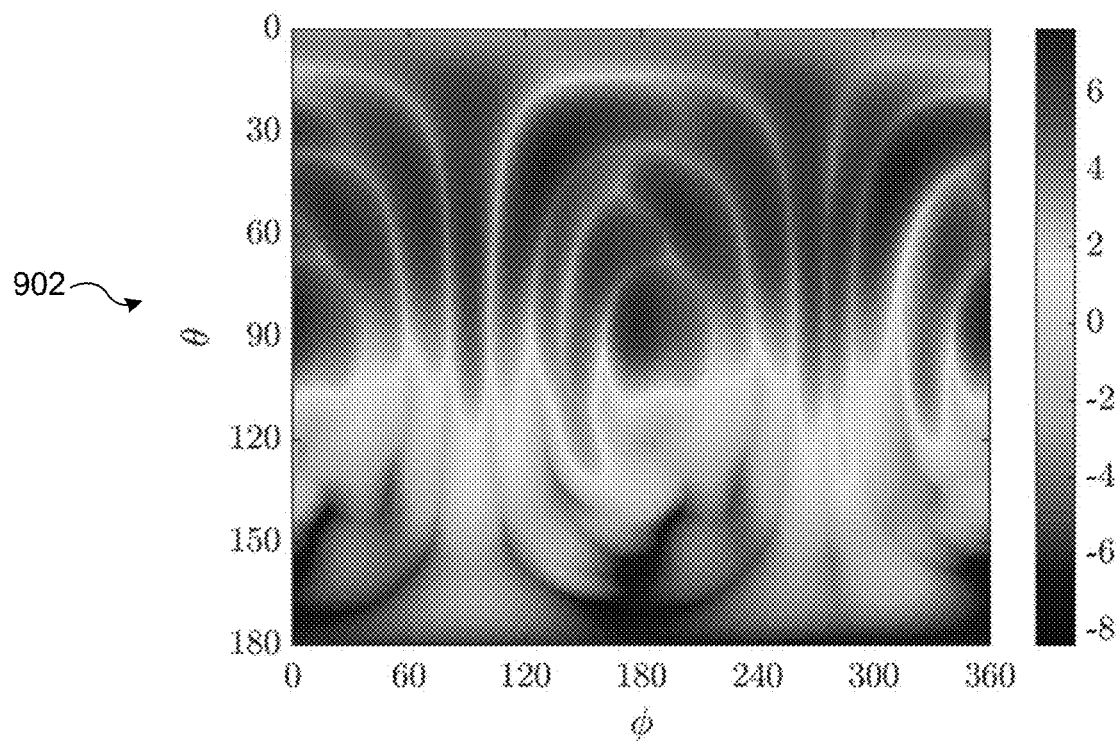
FIG. 9 illustrates example composite beam patterns for codebooks of communication only and communication plus radar operation modes that are designed using a process of joint codebook design according to embodiments of the present disclosure.
Figure 9:
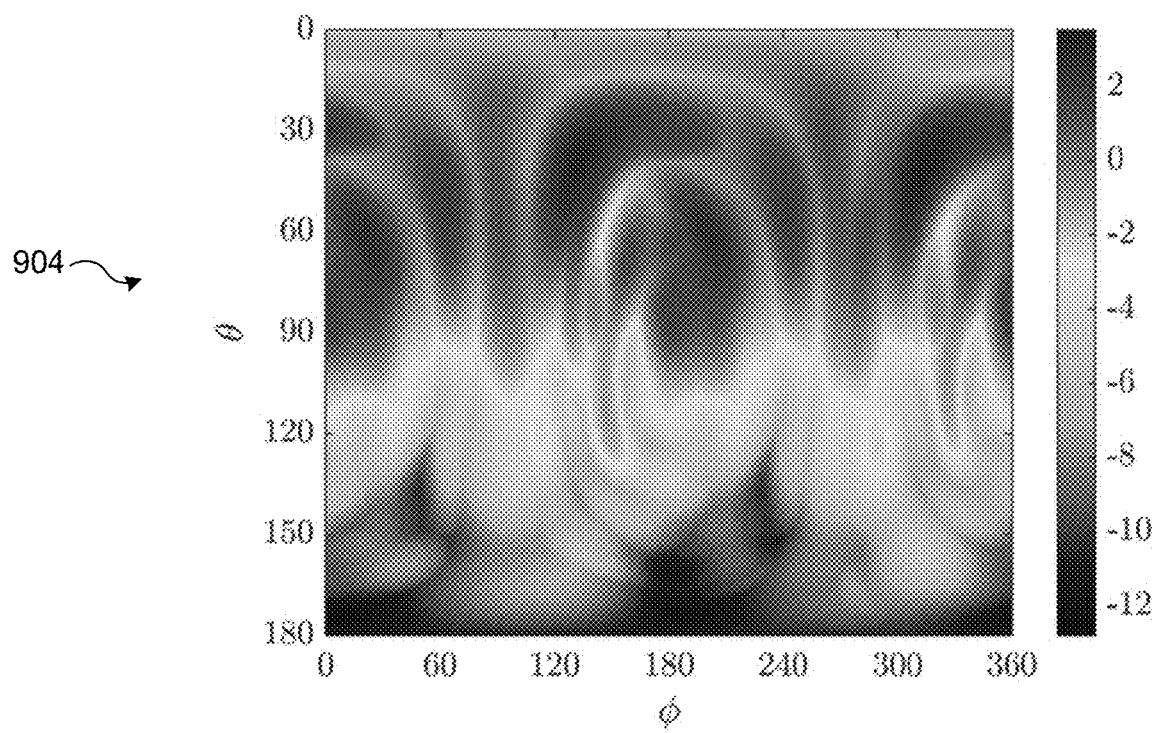

FIG. 9 illustrates example composite beam patterns for codebooks of comm. only and comm.+radar operation modes that are designed using a process of joint codebook design according to embodiments of the present disclosure. For the purposes of this disclosure the process of FIG. 9 will be discussed as an embodiment for obtaining the codebooks in information 704 of FIG. 7, but it is understood that this process could be used in any suitable beam management process.

In this embodiment, beams for comm.+radar operation modes are designed to be similar to the beams of the comm. only mode. There are multiple design metrics that can be used to design codewords for $N_c < N$ antenna elements used for communication in the comm.+radar operation mode to be similar to the codewords for N antenna elements used for communication in the comm. only operation mode. One way to define the similarity is based on the resemblance of the beam patterns. For example, codeword i in the codebook of the comm. only operation mode results in a specific beam pattern (denoted as the $i^{th}$ beam below for simplicity). The design criterion for obtaining the $i^{th}$ codeword in the codebook of the comm.+radar operation mode can then be to maximize the resemblance of the beam pattern with that of the comm. only mode $i^{th}$ beam.

There are multiple ways to formalize the concept of "resemblance". In one approach, a similarity score is defined. Specifically, assuming that there are uniform sampling points (θ, φ) on the unit-sphere, the similarity score is defined as:

$$s_i = \frac{1}{\Sigma_{(\theta,\phi)} G_i^2(\theta, \phi)} \sum_{(\theta,\phi)} G_i(\theta, \phi) B(\theta, \phi) \quad (1)$$

where $G_i(\theta, \phi)$ is the radiation pattern of the $i^{th}$ beam in the comm. only mode codebook (i.e., a beam from N antennas), and $B(\theta, \phi)$ is the radiation pattern of the beam in comm.+radar mode (i.e., a beam from $N_c < N$ antennas). The term $\Sigma_{(\theta, \phi)} G_i^2(\theta, \phi)$ is used to normalize the similarity score, such that $0 \le s_i \le 1$, and the similarity score between a beam and itself is one. The objective of the beam design for comm.+radar mode is then to maximize the similarity score.

If the $m^{*th}$ weight vector for comm. only mode is represented as $w_{m*}$, and the $m^{*th}$ weight vector for comm.+radar mode is represented as $w'_{m*}$, then the selection vector based process of FIG. 7 can be used with these weight vectors for deciding the best beam to be used in the first beam management cycle after mode switch. Although the procedure to decide the beam post-switch is identical to the previous embodiment, the beams themselves are likely to be different. In particular, designing the beams to maximize similarity can make the use of higher $N_r$ feasible. Furthermore, the beams designed to maximize similarity can make it possible to use the procedure of FIG. 7 in NLOS channels.

Referring now to FIG. 9, an example of composite beam patterns for jointly-designed codebooks that are designed using this embodiment (using a similarity metric based criterion) are illustrated. In the illustrated example, there are N=5 antenna elements. Beam pattern 902 is a composite beam pattern of a codebook used for comm. only mode (i.e., $N_c$=5 antenna elements). Beam pattern 904 is a composite beam pattern of a codebook used for comm.+radar mode with $N_c$=3 antenna elements (i.e., with $N_c$=2 radar antenna elements). There are high similarities between beam patterns 902 and 904 generated by the jointly-designed codebooks.

Figure 10:
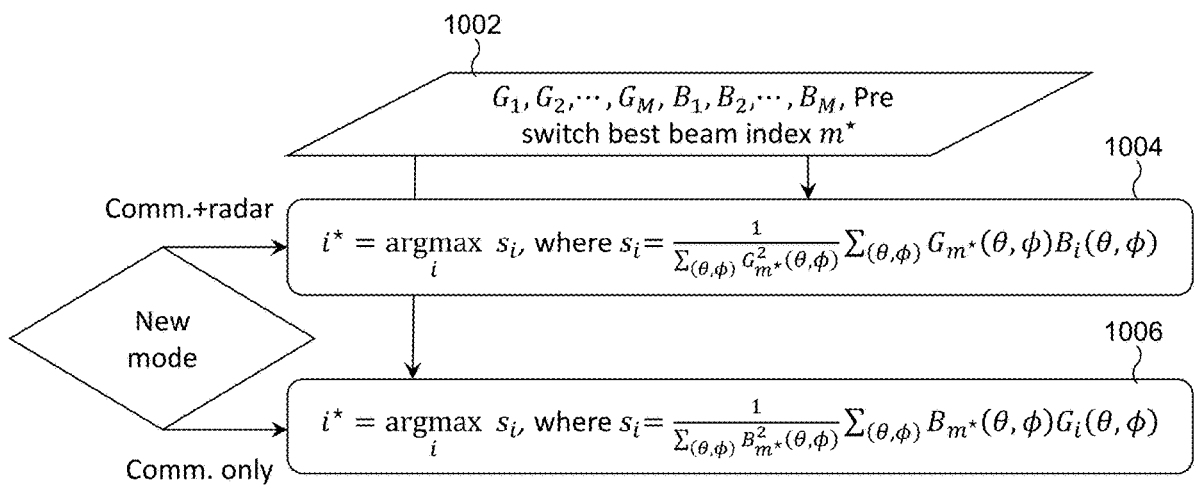
FIG. 10 illustrates an example process for selecting a suitable beam after the mode switch based on a similarity metric, and using independent design of codebooks of communication only and communication plus radar operation modes, according to embodiments of the present disclosure.

FIG. 10 illustrates an example process for selecting a suitable beam after the mode switch based on a similarity metric, and using independent design of codebooks of comm. only and comm.+radar operation modes, according to embodiments of the present disclosure. For the purposes of this disclosure the process of FIG. 10 will be discussed as an embodiment of step 610 of FIG. 6, but it is understood that this process could be used in any suitable beam management process.

In this embodiment, the codebooks for comm. only mode and comm.+radar mode are designed independently of each other with a suitable objective, e.g., to maximize the spherical coverage in each mode. Then, if the pre-switch best beam index is m*, the post-switch beam index is determined to maximize the similarity with the pre-switch best beam. The procedure to find a suitable beam after mode switching based on maximizing the similarity with the current best beam is illustrated in FIG. 10.

If the pre-switch mode is comm. only mode, the pre-switch best beam index is m*, and the pre-switch best beam pattern is denoted as $G_{m*}(\theta, \phi)$. The beam patterns of the comm.+radar mode beams are denoted as $B_i(\theta, \phi)$, i ∈ {1, 2, . . . , M}. These values can be included in information 1002 that is predetermined and known to the electronic device 101.

The post-switch best beam is then the beam with pattern $B_i$ that has the highest similarity with $G_{m*}(\theta, \phi)$. Similarity here can be calculated according to Equation (1) above, at step 1004. The same process can be used to determine the best post-switch beam when the operation mode switches from comm.+radar to comm. only by switching the roles of $G_{m*}$ with $B_{m*}$, and $B_i(\theta, \phi)$, i ∈ {1, 2, . . . , M} with $G_i(\theta, \phi)$, i ∈ {1, 2, . . . , M} (step 1006).

The benefit of this strategy is that the independent codebook design of the comm. only and comm.+radar codebooks provides near optimal codebooks for each mode (e.g., in terms of spherical coverage), ignoring the first beam management cycle after switching modes, and hence the codebooks are well suited for beam management. By comparison, the jointly designed codebooks discussed with respect to FIG. 9 may have similar beam patterns, but different spherical coverage. The disadvantage of the independent design process is that, even following the similarity score based method of FIG. 10, the absolute value of the similarity score may be low, meaning that the beam with the highest similarity is still not very similar to the best pre-switch beam.

It is possible to use the design process illustrated with respect to FIGS. 9 and 10 together. Specifically, the UE can store three codebooks. One codebook corresponding to the comm. only mode, and two codebooks for comm.+radar mode. One of the two comm.+radar mode codebooks (called codebook 1) is the codebook designed jointly with the comm. only codebook (e.g., to maximize similarity), and the second comm.+radar mode codebook (called codebook 2) is the codebook designed independently (e.g., to maximize spherical coverage). In the first beam management cycle after the switch, the best beam is determined from codebook 1 as discussed with respect to FIG. 9. The reference signal measurements, however, will be made using codebook 2. As such, when the first beam management cycle ends, the best beam from codebook 2 can be used. This strategy can potentially perform better than that discussed with respect to FIG. 9 (as from the second beam management cycle onwards a codebook designed for spherical coverage is used) and that discussed with respect to FIG. 10 (as in the first beam management cycle a beam more likely to be good is used).

Figure 11A:
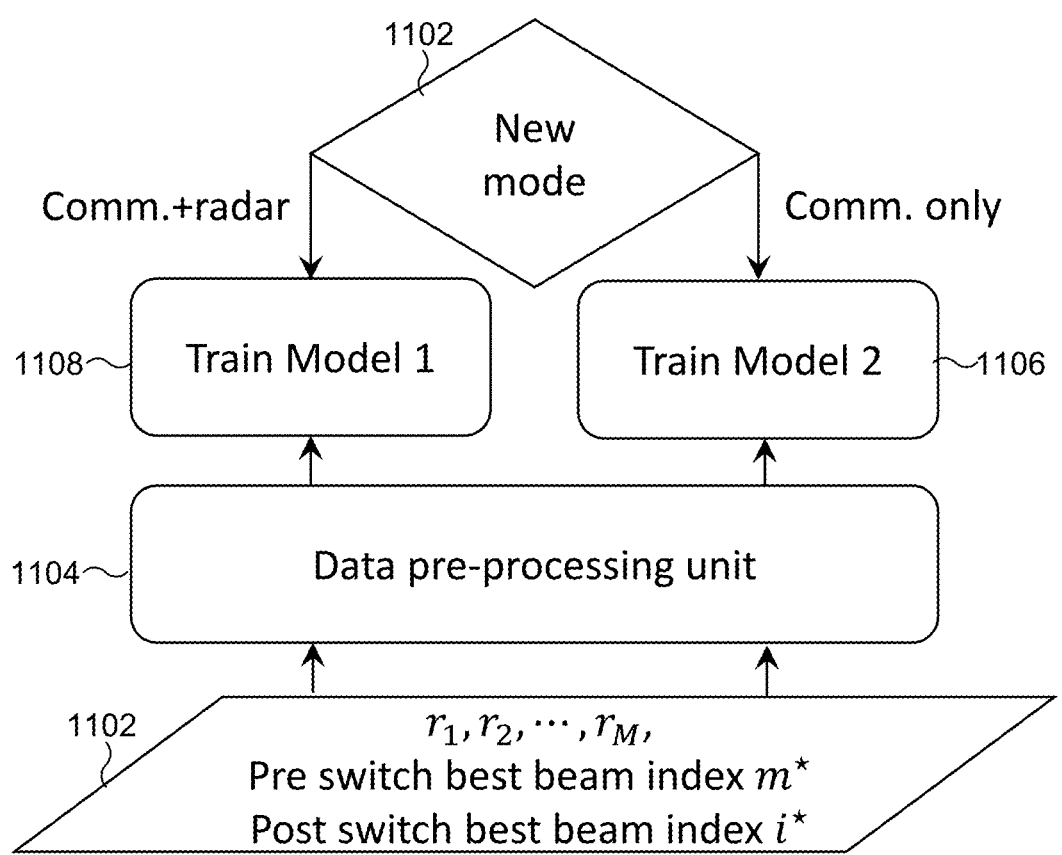
FIGS. 11A-11C illustrate an example process for selecting a suitable beam after the mode switch using a data-driven method according to embodiments of the present disclosure.
Figure 11B:
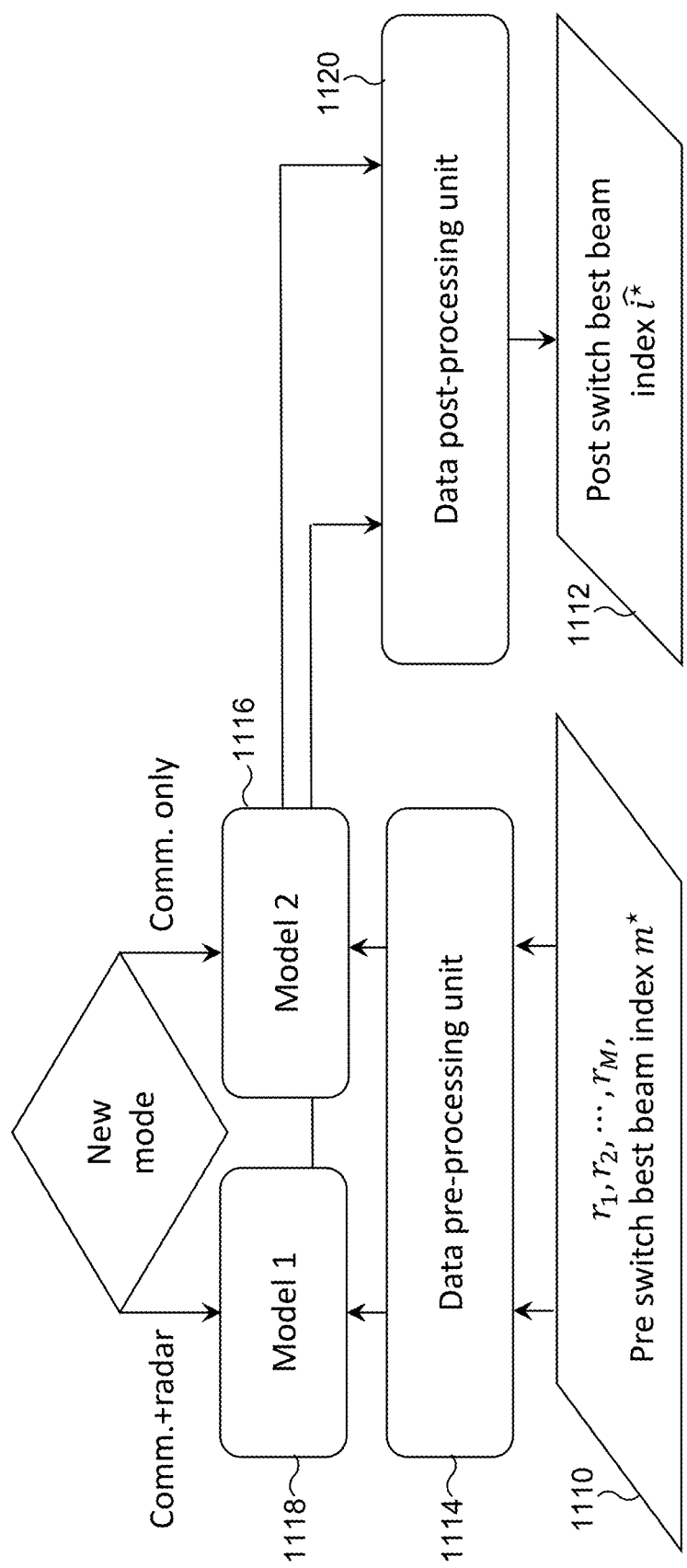
Figure 11C:
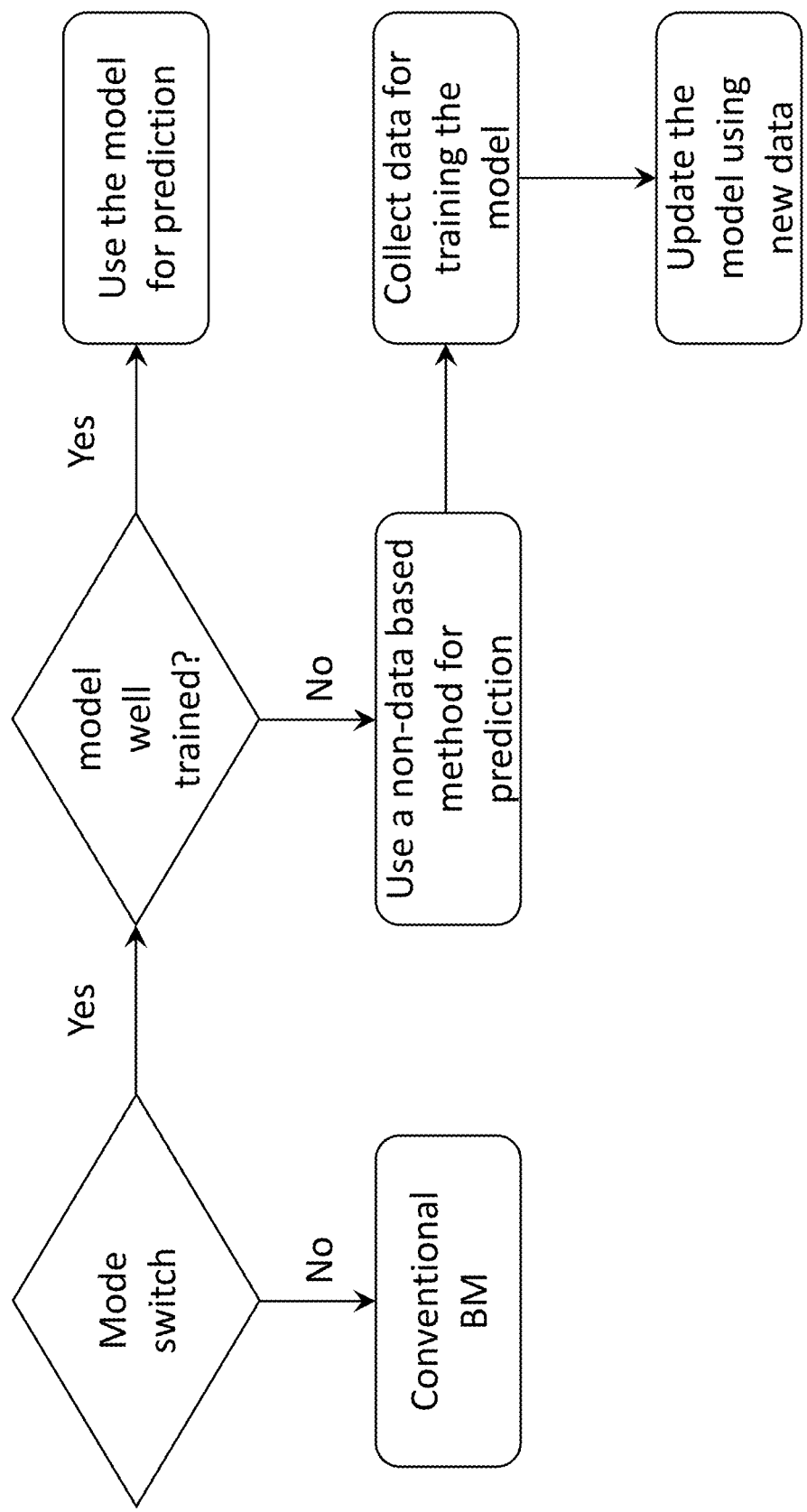

FIGS. 11A-11C illustrate an example process for selecting a suitable beam after the mode switch using a data-driven method according to embodiments of the present disclosure. For the purposes of this disclosure the process of FIGS. 11A-11C will be discussed as an embodiment of step 610 of FIG. 6, but it is understood that this process could be used in any suitable beam management process.

In embodiments where the codebooks for comm. only mode and comm.+radar mode are designed jointly to be similar to each other, there is a one-to-one mapping in the beams of both codebooks from the point of view of the design metric. That said, due to imperfections in the design, even the jointly designed beams can benefit from an intelligent post-switch beam selection method. The imperfections here imply that it is possible that due to multi-paths in a NLOS scenario, the beam most similar to the pre-mode-switch best beam may not be the best beam post-switch.

In the present embodiment, for deciding the best beam in the first beam management cycle after mode switching, a supervised learning based strategy can be adopted. Specifically, two machine learning (ML) models are trained, one for predicting the best beam after comm. only to comm.+radar mode switch, and one to predict the best beam after comm.+radar mode to comm. only mode switch. Machine learning classifiers that can be used for the training and testing phases include, but are not limited to, K-Nearest Neighbors (KNN), Support Vector Machine (SVM), Decision Tree, Random Forest, Neural Network, Convolutional Neural Network (CNN), and Long Short Term Memory (LSTM).

The feature vector for this embodiment contains two components, namely an M dimensional pre-mode-switching RSRP table, and the pre-mode-switching best beam index m*. Including the pre-mode-switching best beam index m* as part of the feature vector is optional, because the decision of the best beam index is itself made based on the RSRP table, and thus this information may be redundant. Nevertheless, including this information may reduce the amount of data required for training, and thus the pre-switch best beam index m* is included in the feature vector of this embodiment. The feature vector is thus an M+1 dimensional vector $f=[r_1, r_2, \ldots, r_M, m^*]^T$, where $r_1, \ldots, r_M$ are the RSRP values in the RSRP table that were measured through the M beams (each beam corresponding to a beam pattern formed by a respective codeword $w_1, \ldots, w_M$).

The label is an M dimensional vector that is the one hot encoded post-switch best beam index. If the post-switch best beam index is i*, the corresponding one hot encoded vector is the i*th basis vector of the M dimensional canonical basis. During the training phase, illustrated in FIG. 11A, the label is fed to the model in addition to the feature vector (information 1102). In the testing (or real-time prediction) phase, illustrated in FIG. 11B, only the feature vector is provided to the model (information 1110), and the model predicts the post-switch best beam index (information 1112).

The basic operation of training two models is illustrated in FIG. 11A. The data pre-processing unit takes in the RSRP values and pre-switch best beam index m* (information 1102) and transforms them into feature vector f at step 1104. The data pre-processing unit also converts the post-switch best beam index i* into one hot encoded form (as the training label) at step 1104. The feature vector and training label are then fed into the corresponding model, depending on whether a model for comm. only mode is being trained (step 1106) or a model for comm.+radar mode is being trained (step 1108).

The prediction phase is illustrated in FIG. 11B. Similar to the training phase, a data pre-processing unit takes in the RSRP values and the pre-switch best beam index m* (information 1110) and creates a feature vector at step 1114, which is then fed to the appropriate model for prediction depending on whether a mode switch to comm. only mode is being performed (step 1116) or a mode switch to comm.+radar mode is being performed (step 1118). The prediction is in the form of an M dimensional probability vector (i.e., each value in the vector is $\in (0,1)$), which is post-processed by a data post-processing unit at step 1120 to yield an estimate of the best beam index $\hat{i}^*$ (information 1112).

Referring again to the prediction phase illustrated in FIG. 11A, At this stage, the procedure to obtain the post-switch best beam index for training can follow multiple strategies. One strategy is simulation-based, in which realistic simulations of the wireless communication channels (e.g., using ray tracing tools), the beams (e.g., based on measured beam patterns), and UE movement and orientation patterns (e.g., by using different movement and orientation speeds) are simulated. Using this synthetic data, the RSRP table can be obtained corresponding to both codebooks (i.e., the codebook of the comm. only mode and the codebook of the comm.+radar mode) simultaneously.

Then, to train Model 1 at step 1108, the comm. only RSRP table and best beam index are used to construct the feature vector, and the comm.+radar RSRP table is used to obtain the post-switch best beam index and subsequently the one hot encoded label. Similarly, to train Model 2 at step 1106, the comm.+radar RSRP table and best beam index are used to get the feature vector, and the comm. only RSRP table is used to obtain the post-switch best beam index and subsequently the one hot encoded label. Once the models are trained, they can be used for prediction in real time using a procedure, e.g., the procedure illustrated in FIG. 11B. The advantage of this strategy is that a lot of data can be generated to train the models (e.g., since variability in the training data can be introduced by merely changing one or more simulation parameters). The disadvantage is that despite best possible efforts, there will still be modeling errors (e.g., due to discrepancies or errors between real-world implementation and simulation parameters) that can result in lower prediction accuracy.

In another strategy to obtain the post-switch best beam index for training, the training data is acquired directly at the UE. In one example, whenever a mode switch is triggered a feature vector can be obtained because the pre-switch RSRP table and the best beam index are available. This information is used to construct the feature vector and the feature vector is saved. The next step is to obtain the label. For this the UE needs to wait one beam management cycle (e.g., the time taken to measure all the new beams once). After one beam management cycle, the RSRP table will contain all entries that are measured using the post-switch codebook, and a decision on the best post-switch beam can be made. This beam index is then used to construct a label. Together, the pre-switch feature vector and the post-switch label constitute one data point.

The advantage of this strategy is that it is based directly on the data collected by a UE, and thus does not suffer from modeling errors. The disadvantage is that only one data point is collected for training each time the mode switches. Since whether there is a need for mode switch or not depends on the higher layers, it is possible to imagine scenarios where the mode switches are relatively infrequent and thus the training data is scarce. That said, once the models have been sufficiently well trained, the scarcity of the data is not important as long as the UE does not change the beam codebooks associated with the comm. only and comm.+radar operations.

Additionally, as illustrated in FIG. 11C, during the period in which the models are not well trained, some non-data based strategy should be used to select a reasonable beam in the first post-switch beam management cycle. Several strategies are possible to check whether the model is well trained or not. One strategy is to check the beam prediction of the model against the beam that is obtained based on the RSRP table after one beam management cycle is complete. If the accuracy of the predicted beam is sufficiently high (e.g., if the predicted beam matches the beam obtained after one beam management cycle sufficiently often), then the model is well trained.

In the above discussion of the strategy that uses mode switches at the UE to obtain training data for the models, it is noted that when the operation mode switches from comm. only to comm.+radar, a training data point is obtained for model 1, and when the operation mode switches from comm.+radar to comm. only, a training data point is obtained for model 2. However, in some embodiments, whenever the operation mode switches a training data point can be generated for both models. This is because the construction of the feature vector as well as the label requires the whole RSRP table. As the model learns to relate one codebook to the other, the temporal sequence, i.e., which codebook was measured first (or pre-switch) and which codebook was measured second (i.e., post-switch), is not important. This strategy doubles the amount of available data to train each model, and reduces the time needed to train the models.

Related to the process for selecting a suitable beam after the mode switch is a consideration of maintaining transmission power or modulation and coding rate after the mode switch. For example, in the above embodiments, it may be a priority for the electronic device 101 to maintain the same effective, or equivalent, isotropically radiated power (EIRP) pre and post mode-switch. For example, a certain EIRP may be required to support a given modulation and coding scheme (MCS) level. To illustrate, when the UE switches from comm. only mode to comm.+radar mode, the number of antennas associated with the comm. system will decrease. This will result in decreased EIRP.

In one embodiment, in order to continue operation in the comm.+radar mode using the MCS level that was used pre-switch in the comm. only mode, the UE will need to increase the transmit power. Specifically, the transmit power can be scaled up by a factor of $$\frac{N}{N_c}.$$

Subsequently, when the UE switches from the comm.+radar mode to the comm. only mode, the UE will have an unnecessarily high EIRP. At this point, the UE can scale down its transmit power by a factor of $$\frac{N_c}{N}$$

to reduce its power consumption. It is understood that the scaling of the power is not limited to the first beam management cycle and will continue into subsequent beam management cycles. Specifically, the power scaling depends on the operation mode, i.e., whether it is comm. only or comm.+radar.

In another embodiment, the UE docs not change the transmit power after the mode switch. Instead the UE changes the MCS level. Specifically, when the UE switches from comm. only mode to comm.+radar mode, it may only be able to support a lower MCS level with the same transmit power, and hence the UE lowers the MCS level to the highest supportable level. How low the MCS level will be post-switch depends on the factor $$\frac{N}{N_c}.$$

Similarly, at a later stage, if the UE switches back to the comm. only mode it can support a higher MCS level. Similar to power scaling, the MCS level adjustment is not limited to the first beam management cycle and will continue into subsequent beam management cycles. Specifically, the MCS level scaling depends on the operation mode, i.e., whether it is comm. only, or comm.+radar.

In the above disclosure, the only cases considered have been cases in which the number of beams in the comm. only mode and the number of beams in the comm.+radar mode are the same. However, the number of beams in the comm. only mode and the number of beam in the comm.+radar mode can be different. Specifically, denoting that there are M beams for the comm. only mode and K beams for the comm.+radar mode, there is no restriction on the relative relation of M and K, i.e., M<K, M=K (considered so far), as well as M>K, are all possible. The case M>K, however, is most likely. This is because in comm.+radar mode the number of antennas used for communication is lower, and hence the beams are likely to be wider. With wider beams, fewer beams are required to cover the whole spherical area, or other region of interest. Multiple embodiments in this disclosure may be extended easily to the case when M≠K. For example, the similarity score based method and the ML based method extend naturally to the general M≠K case.

Additionally, systems of the present disclosure can operate with more than two operating modes. The embodiments above discuss the comm. only mode (with all antennas assigned to the communication system, i.e., $N_c$=N) and radar only mode (with all antennas assigned to the radar system, i.e., $N_r$=N). In addition, there can be a "communication centric" mode (referred to as comm. centric mode) in which $N_c$<N antennas are assigned for communication and $N_r$<N antennas assigned to the radar system (where $N_c+N_r$=N), but the $N_c$ antennas are first selected to optimize the communication system performance, and the remaining $N_r$ antennas are assigned to the radar system. Similarly, there can be a "radar centric" mode in which, again, $N_r$<N antennas are assigned to the radar system and $N_c$<N antennas are assigned to the communication system (where $N_c+N_r$=N), but in which the $N_r$ antennas for the radar system are selected first to optimize the performance of the radar system, and the remaining $N_c$ antennas are assigned to the communication system.

Depending on the requirements of the UE, the UE may decide to operate in one of these many modes, e.g., comm. only, radar only, comm. centric, or radar centric. The decision of the UE can be based on the input from higher layers, i.e., the higher layers of the OSI model above the physical layer. As an example, the higher layers could abstract the current data rate requirement into four levels, and indicate the current level to the PHY layer. These four levels will then correspond, from highest to zero throughput requirement, to comm. only, comm. centric, radar centric, and radar only modes. Zero throughput here refers to the mmWave operation throughput, and does not mean that the device does not have an active communication connection (e.g., using a legacy communication protocol). In another example, the decision on which mode is desired is made by the modem, for example when the radar operation is designed to facilitate communication operation (or vice versa), implying the need for tighter integration of radar and communication operations. Any subset of these modes may be implemented at the UE. That is, it is not necessary to support all four of these modes simultaneously.

Figure 12:
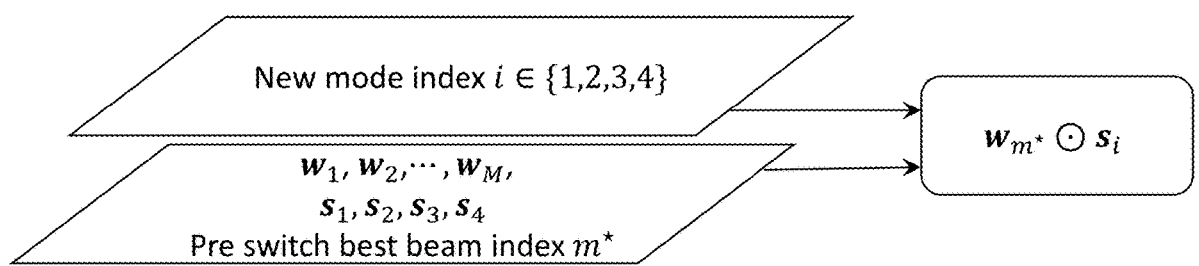
FIG. 12 illustrates the selection vector based strategy of FIG. 7 extended to the case when four operation modes are implemented in the electronic device.

Whenever a mode switch happens, the best beam for the first beam management cycle post-switch needs to be predicted. The embodiments discussed herein above regarding prediction of the best beam post-beam-switch can be extended to cover any of the implemented modes. For example, FIG. 12 illustrates the selection vector based strategy of FIG. 7 extended to the case when all four modes are implemented in the UE. For ease of explanation, an index i is assigned to the modes: 1 to comm. only mode, 2 to radar only mode, 3 to comm. centric mode and 4 to radar centric mode. Each mode has a distinct selection vector $s_1$, $s_2$, $s_3$, and $s_4$, where the subscript on the selection vector is the index i corresponding to the mode, and associates a selection vector with the mode. Then the procedure shown in FIG. 12 can be used to decide the post-switch best beam based on the pre-switch best beam index m*, the weight vectors $w_1, w_2, \ldots, w_m$, the selection vectors $s_1, s_2, s_3$, and $s_4$, and the post-switch mode index i. Specifically, the selection vector corresponding to the post-switch mode is applied similarly to the selection vector of FIG. 7. Other embodiments in this disclosure can be similarly extended to the multimode case with radar centric and comm. centric modes.

FIGS. 13A-13F illustrate an example process for performing beam management in systems with antenna arrays capable of operating in combined radar and communication modes in accordance with various embodiments of the present disclosure. The process is performed by an electronic device such as electronic device 101, which includes a processor, such as processor 120, and an antenna array, such as antenna module 197, which in turn comprises a plurality of antenna elements. The plurality of antenna elements are configured to operate in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming. The process is discussed herein below as performed by the processor of the electronic device 101.

The process begins with the device performing a mode switch on the plurality of antenna elements to switch between operation in the first mode and the second mode (step 1305).

Next, the device determines, after the mode switch is performed, a new beam to use for the communications during a first beam management cycle after the mode switch (step 1310). This can be done in various ways, which will be described further below.

The device then performs, using the new beam, the first beam management cycle on the plurality of antenna elements after the mode switch to obtain signal quality measurements (step 1315). For example, these signal quality measurements may support conventional beam management.

In some embodiments, during this first beam management cycle, after performing the mode switch from the first mode to the second mode, the device scales a transmit power of the remainder of the plurality of antennas up by a factor of $$\frac{N}{N_c}.$$

Here N is a total number of the plurality of antennas and $N_c$ is a number of the remainder of the plurality of antennas. In other embodiments, during this first beam management cycle after performing the mode switch from the second mode to the first mode, the device scales a transmit power of the remainder of the plurality of antennas down by a factor of $$\frac{N_c}{N}.$$

This scaling can be done to maintain the same EIRP pre and post mode-switch.

Finally, the device performs at least one second beam management cycle on the plurality of antenna elements after the first beam management cycle, using an updated beam that is determined based on the signal quality measurements obtained during the first beam management cycle (step 1320). This step can be considered conventional beam management.

Figure 13A:
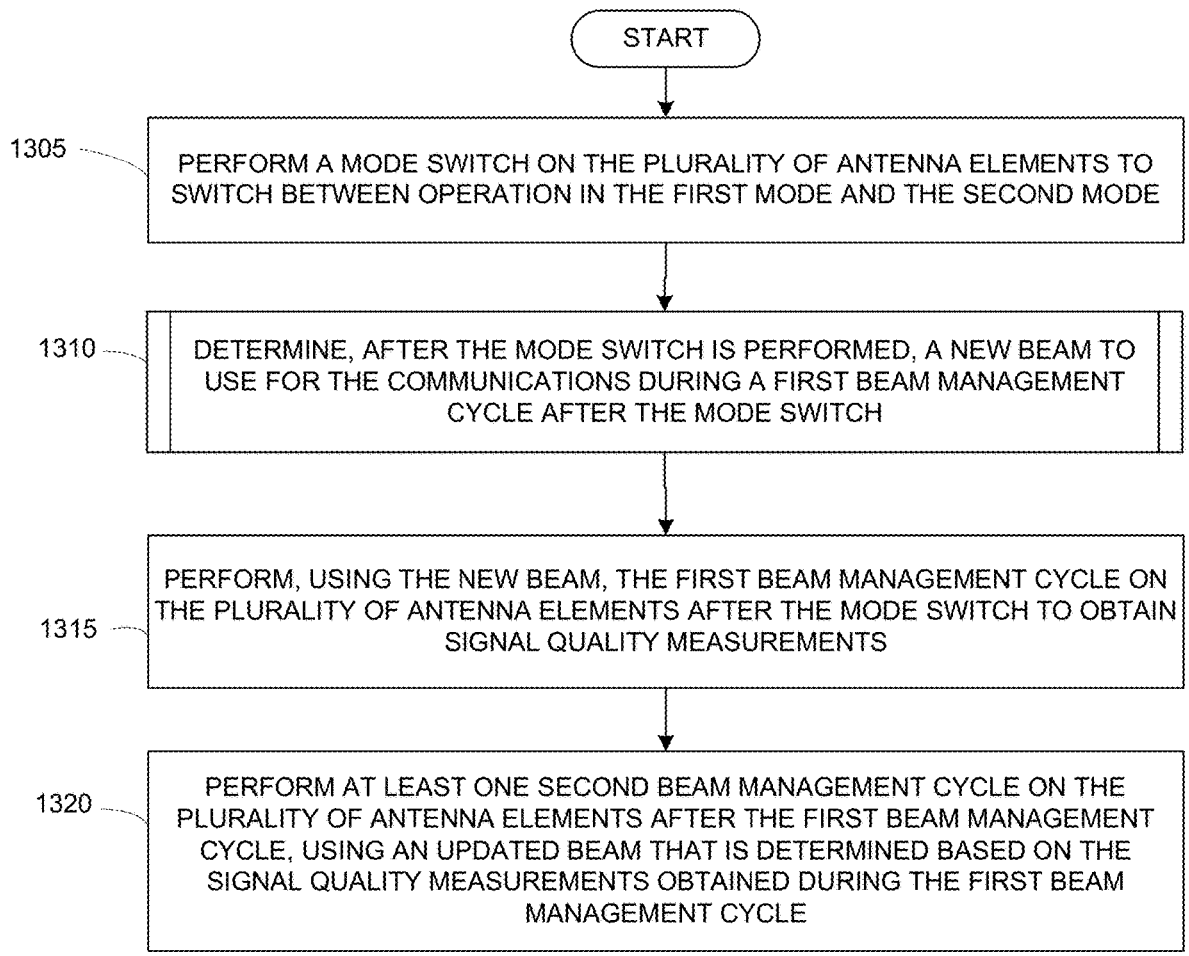
FIGS. 13A-13F illustrate an example process for performing beam management in systems with antenna arrays capable of operating in combined radar and communication modes in accordance with various embodiments of the present disclosure.
Figure 13B:
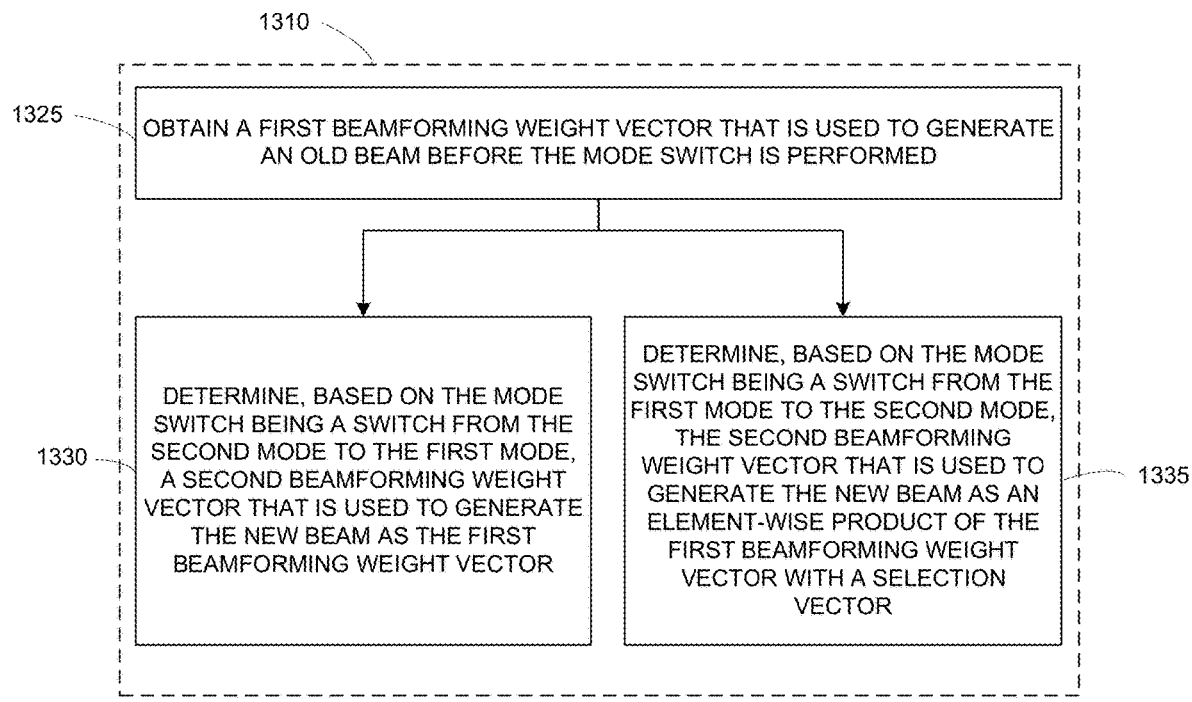

Referring now to FIG. 13B, there is illustrated an example embodiment of step 1310 of FIG. 13A using a selection vector approach. At step 1325, the device obtains a first beamforming weight vector that was used to generate an old beam before the mode switch was performed. This step could occur before step 1305. The first beamforming weight vector includes an entry corresponding to each one of the plurality of antenna elements, each entry comprising a weight to be applied to the corresponding one of the plurality of antenna elements.

Next, the device determines, based on the mode switch being a switch from the second mode to the first mode, a second beamforming weight vector that is used to generate the new beam as the first beamforming weight vector (step 1330). Alternatively, the device determines, based on the mode switch being a switch from the first mode to the second mode, the second beamforming weight vector that is used to generate the new beam as an element-wise product of the first beamforming weight vector with a selection vector (step 1335).

The selection vector includes an entry corresponding to each one of the plurality of antenna elements. Entries of the selection vector that correspond to one of the plurality of antenna elements that is used for the radar in the second mode are set to 0, and entries of the selection vector that correspond to one of the plurality of antenna elements that is used for the communications in the second mode are set to 1.

Figure 13C:
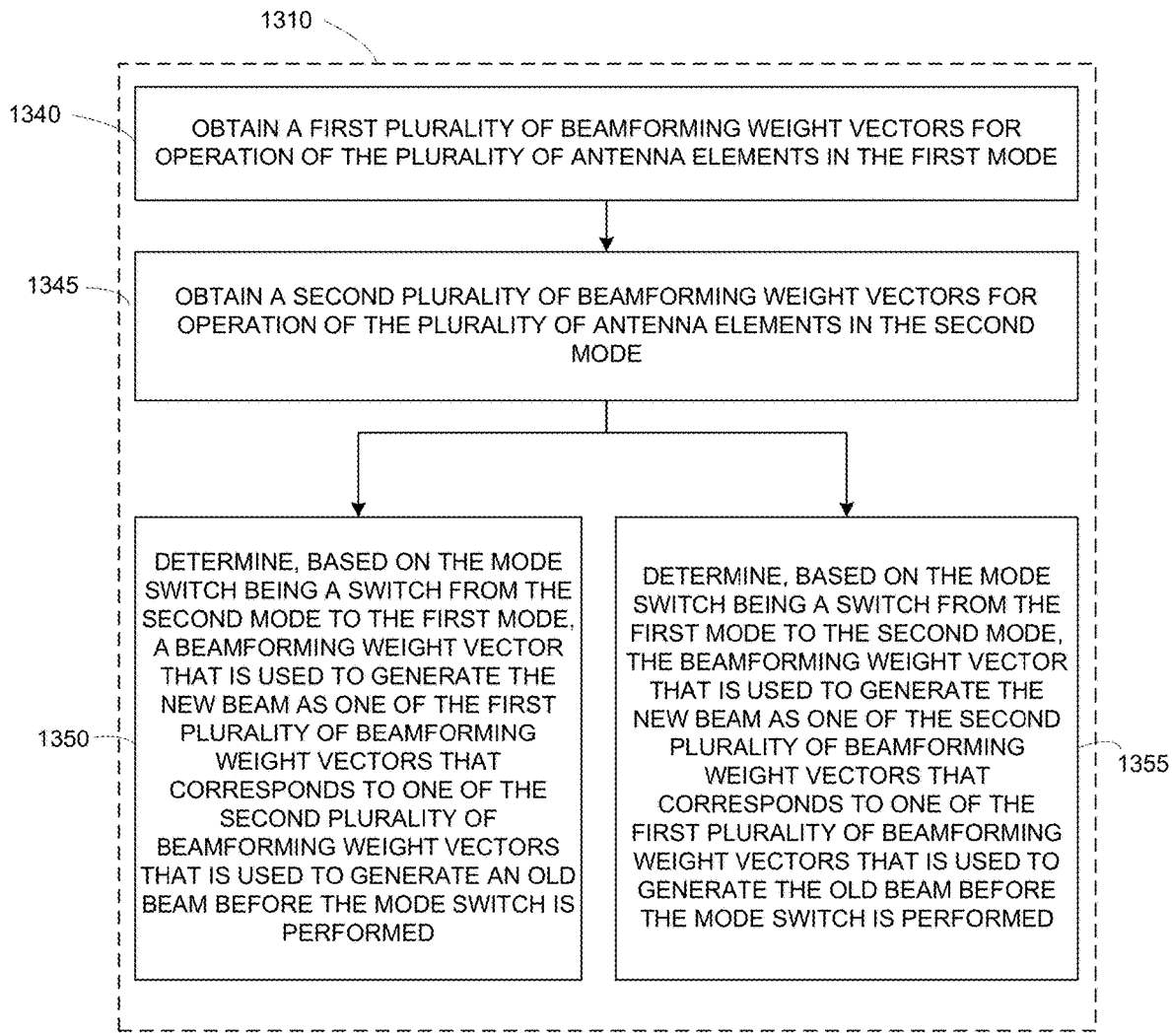

Referring now to FIG. 13C, there is illustrated an example embodiment of step 1310 of FIG. 13A using a joint similar codebook design approach. At step 1340, the device obtains a first plurality of beamforming weight vectors for operation of the plurality of antenna elements in the first mode. Each of the first plurality of beamforming weight vectors includes an entry corresponding to each one of the plurality of antenna elements, each entry comprising a weight to be applied to the corresponding one of the plurality of antenna elements in the first mode.

At step 1345, the device obtains a second plurality of beamforming weight vectors for operation of the plurality of antenna elements in the second mode. Each of the second plurality of beamforming weight vectors includes an entry corresponding to each one of the plurality of antenna elements, each entry comprising a weight to be applied to the corresponding one of the plurality of antenna elements in the second mode. Steps 1340 and 1345 could occur before step 1305.

The first and second pluralities of beamforming weight vectors are designed such that each one of the first plurality of beamforming weight vectors corresponds to one of the second plurality of beamforming weight vectors, and a second radiation pattern of a second beam that is generated using each one of the second plurality of beamforming weight vectors has a maximized similarity to a first radiation pattern of a first beam that is generated using the corresponding one of the first plurality of beamforming weight vectors.

At step 1350, the device determines, based on the mode switch being a switch from the second mode to the first mode, a beamforming weight vector that is used to generate the new beam as one of the first plurality of beamforming weight vectors that corresponds to one of the second plurality of beamforming weight vectors that is used to generate an old beam before the mode switch is performed.

Figure 13D:
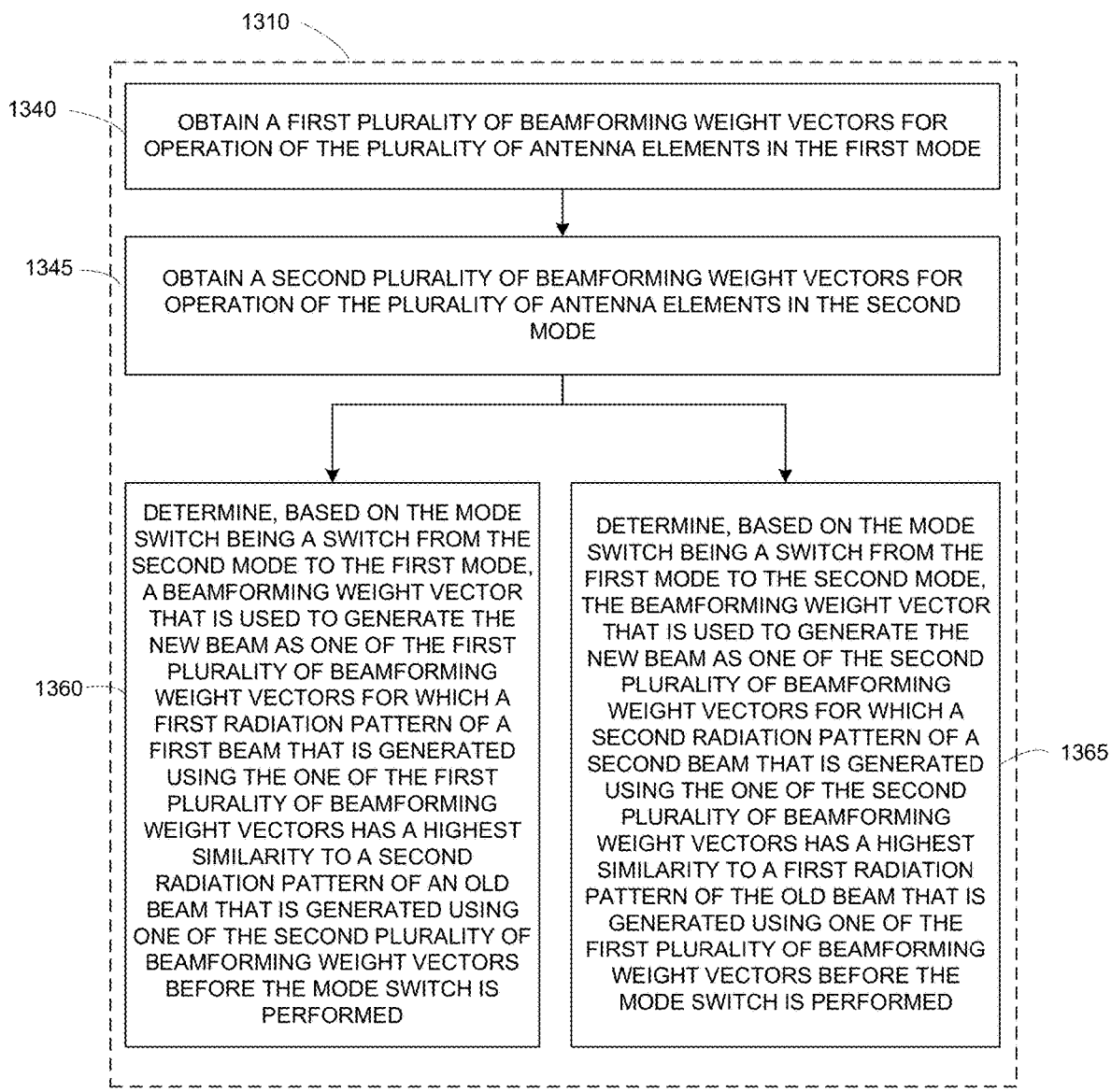

Alternatively, at step 1355, the device determines, based on the mode switch being a switch from the first mode to the second mode, the beamforming weight vector that is used to generate the new beam as one of the second plurality of beamforming weight vectors that corresponds to one of the first plurality of beamforming weight vectors that is used to generate the old beam before the mode switch is performed Referring now to FIG. 13D, there is illustrated an example embodiment of step 1310 of FIG. 13A using an independent codebook design and similarity metric approach. FIG. 13D begins with the same steps 1340 and 1345 as FIG. 13C, by which the device obtains a first plurality of beamforming weight vectors for operation of the plurality of antenna elements in the first mode and a second plurality of beamforming weight vectors for operation of the plurality of antenna elements in the second mode. Steps 1340 and 1345 could occur before step 1305.

This embodiment differs from that of FIG. 13C in that the first plurality of beamforming weight vectors are designed to maximize a predetermined objective while operating in the first mode, and the second plurality of beamforming weight vectors are designed to maximize the predetermined objective while operating in the second mode. That is, the first and second pluralities of beamforming weight vectors are designed independently to achieve the predetermined objective.

Next, at step 1360, the device determines, based on the mode switch being a switch from the second mode to the first mode, a beamforming weight vector that is used to generate the new beam as one of the first plurality of beamforming weight vectors for which a first radiation pattern of a first beam that is generated using the one of the first plurality of beamforming weight vectors has a highest similarity to a second radiation pattern of an old beam that is generated using one of the second plurality of beamforming weight vectors before the mode switch is performed.

Alternatively, at step 1365, the device determines, based on the mode switch being a switch from the first mode to the second mode, the beamforming weight vector that is used to generate the new beam as one of the second plurality of beamforming weight vectors for which a second radiation pattern of a second beam that is generated using the one of the second plurality of beamforming weight vectors has a highest similarity to a first radiation pattern of the old beam that is generated using one of the first plurality of beamforming weight vectors before the mode switch is performed.

Figure 13E:
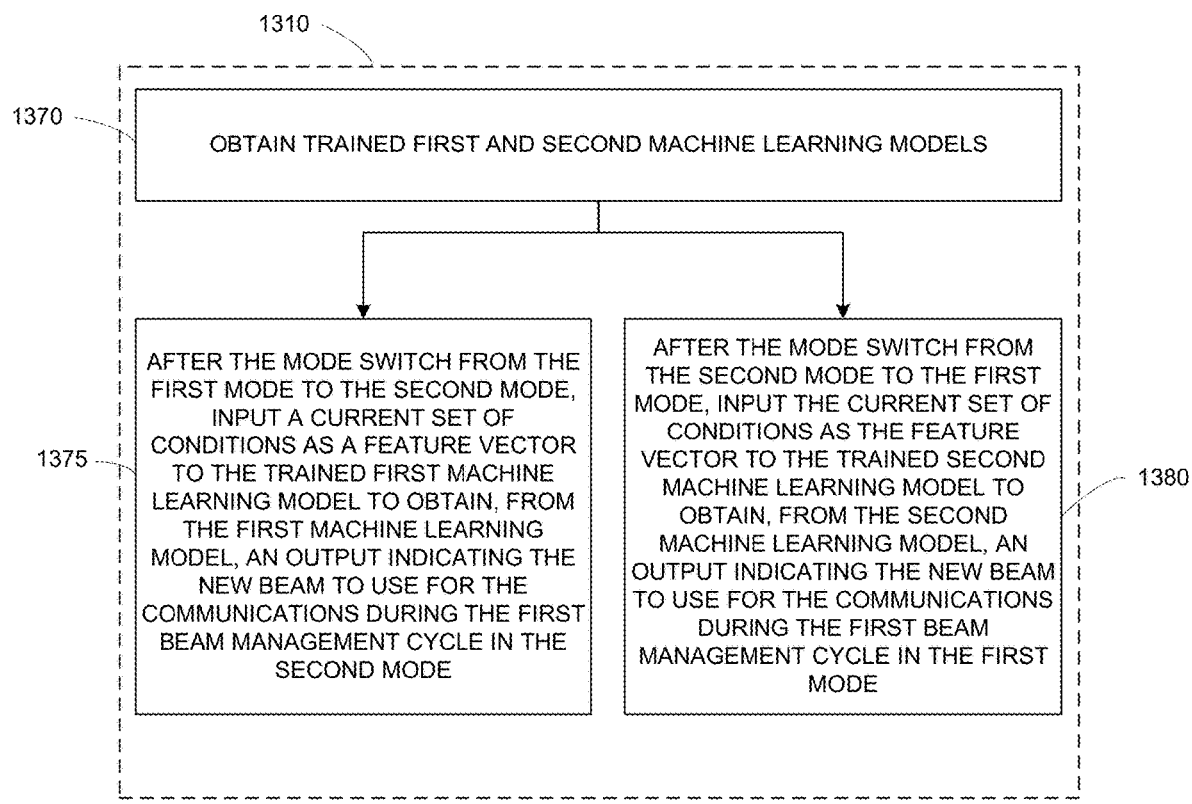

Referring now to FIG. 13E, there is illustrated an example embodiment of step 1310 of FIG. 13A using a data-driven (e.g., machine learning) approach. In this embodiment, machine learning models are trained based on simulation data.

At step 1370, the device obtains trained first and second machine learning models. In some embodiments, the machine learning models may be trained by another device, while in other embodiments the machine learning models may be trained by the device performing the process of FIG. 13E. Step 1370 could occur before step 1305.

The first machine learning model is trained using a plurality of first training feature vectors and a plurality of first training labels that each correspond to one of the plurality of first training feature vectors. Each of the plurality of first training feature vectors comprises signal quality values, under one first set of conditions, for each possible beam that can be formed in the first mode, and the corresponding first training label comprises a beam after the mode switch to the second mode under the one first set of conditions.

The second machine learning model is trained using a plurality of second training feature vectors and a plurality of second training labels that each correspond to one of the plurality of second training feature vectors. Each of the plurality of second training feature vectors comprises signal quality values, under one second set of conditions, for each possible beam that can be formed in the second mode, and the corresponding second training label comprises a beam after the mode switch to the first mode under the one second set of conditions.

In this embodiment, the signal quality values for each possible beam that can be formed in the first mode and the signal quality values for each possible beam that can be formed in the second mode are obtained based on a simulation of the electronic device under different first and second sets of conditions, respectively. For the first training label in this embodiment, the beam after the mode switch to the second mode under the one first set of conditions is determined as a beam that has a highest signal quality value from the signal quality values for each possible beam that can be formed in the second mode under the one first set of conditions. For the second training label in this embodiment, the beam after the mode switch to the first mode under the one second set of conditions is determined as a beam that has a highest signal quality value from the signal quality values for each possible beam that can be formed in the first mode under the one second set of conditions.

After the mode switch from the first mode to the second mode, the device inputs a current set of conditions as a feature vector to the trained first machine learning model to obtain, from the first machine learning model, an output indicating the new beam to use for the communications during the first beam management cycle in the second mode (step 1375).

Alternatively, after the mode switch from the second mode to the first mode, the device inputs the current set of conditions as the feature vector to the trained second machine learning model to obtain, from the second machine learning model, an output indicating the new beam to use for the communications during the first beam management cycle in the first mode (step 1380).

Figure 13F:
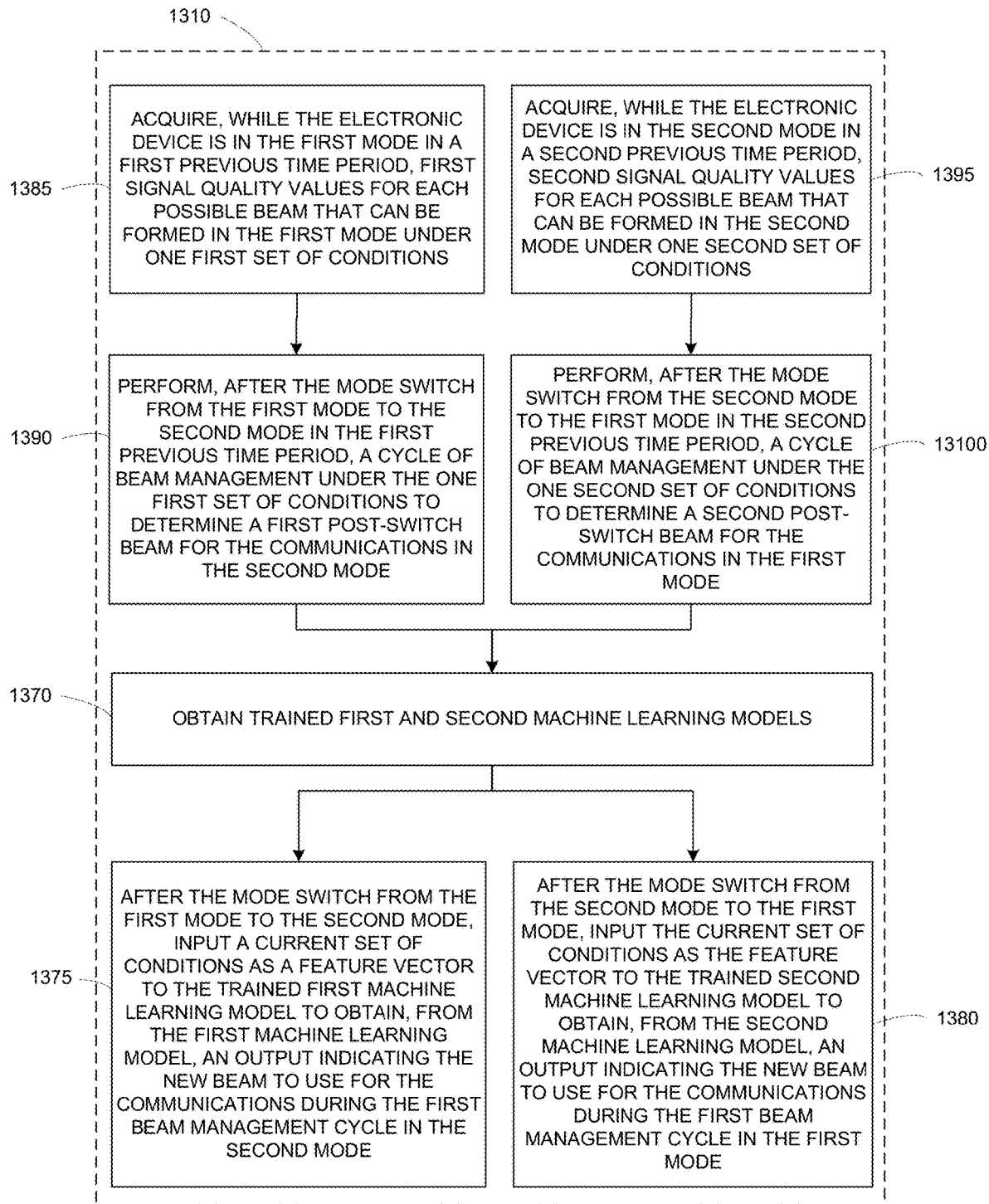

Referring now to FIG. 13F, there is illustrated an example embodiment of step 1310 of FIG. 13A using a data-driven (e.g., machine learning) approach. In this embodiment, machine learning models are trained based on measured data.

At step 1385, the device acquires, while it is in the first mode in a first previous time period, first signal quality values for each possible beam that can be formed in the first mode under one first set of conditions. At step 1390, the device performs, after the mode switch from the first mode to the second mode in the first previous time period, a cycle of beam management under the one first set of conditions to determine a first post-switch beam for the communications in the second mode.

A first machine learning model is trained using at least one first training feature vector and at least one first training label that corresponds to the at least one first training feature vector, wherein the at least one first training feature vector comprises the first signal quality values, and the corresponding first training label comprises the first post-switch beam. In some embodiments, the first machine learning model is trained by the device performing the process of FIG. 13F, while in other embodiments, the first machine learning model is trained by another device.

At step 1395, the device acquires, while it is in the second mode in a second previous time period, second signal quality values for each possible beam that can be formed in the second mode under one second set of conditions, and at step 13100, the device performs, after the mode switch from the second mode to the first mode in the second previous time period, a cycle of beam management under the one second set of conditions to determine a second post-switch beam for the communications in the first mode.

A second machine learning model is trained using at least one second training feature vector and at least one second training label that corresponds to the at least one second training feature vector, wherein the at least one second training feature vector comprises the second signal quality values, and the corresponding second training label comprises the second post-switch beam. In some embodiments, the second machine learning model is trained by the device performing the process of FIG. 13F, while in other embodiments, the second machine learning model is trained by another device. The above steps could all occur before step 1305.

Steps 1370-1380 may then be performed similarly to FIG. 13E. That is, at step 1370, the device obtains the trained first and second machine learning models, and at steps 1375 and 1380 the device uses the trained first and second machine learning models after a mode switch to obtain a new beam to use for the communications during the first beam management cycle in the new mode.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
a plurality of antenna elements configured to operate in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming; and
a processor configured to:
perform a mode switch on the plurality of antenna elements to switch between operation in the first mode and the second mode;
determine, after the mode switch is performed, a new beam to use for the communications during a first beam management cycle after the mode switch;
perform, using the new beam, the first beam management cycle on the plurality of antenna elements after the mode switch to obtain signal quality measurements; and
perform at least one second beam management cycle on the plurality of antenna elements after the first beam management cycle, using an updated beam that is determined based on the signal quality measurements obtained during the first beam management cycle.

2. The electronic device of claim 1, wherein the processor is configured to:
obtain a first beamforming weight vector that is used to generate an old beam before the mode switch is performed, wherein the first beamforming weight vector includes an entry corresponding to each one of the plurality of antenna elements, each entry comprising a weight to be applied to the corresponding one of the plurality of antenna elements;
determine, based on the mode switch being a switch from the second mode to the first mode, a second beamforming weight vector that is used to generate the new beam as the first beamforming weight vector; and
determine, based on the mode switch being a switch from the first mode to the second mode, the second beamforming weight vector that is used to generate the new beam as an element-wise product of the first beamforming weight vector with a selection vector,
wherein:
the selection vector includes an entry corresponding to each one of the plurality of antenna elements, entries of the selection vector that correspond to one of the plurality of antenna elements that is used for the radar in the second mode are set to 0, and entries of the selection vector that correspond to one of the plurality of antenna elements that is used for the communications in the second mode are set to 1.

3. The electronic device of claim 1, wherein the processor is configured to:

obtain a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode; and obtain a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode, wherein the first and second pluralities of beamforming weight vectors are designed such that each one of the first plurality of beamforming weight vectors corresponds to one of the second plurality of beamforming weight vectors, and a second radiation pattern of a second beam that is generated using each one of the second plurality of beamforming weight vectors has a maximized similarity to a first radiation pattern of a first beam that is generated using the corresponding one of the first plurality of beamforming weight vectors, and wherein the processor is further configured to:

determine, based on the mode switch being a switch from the second mode to the first mode, a beamforming weight vector that is used to generate the new beam as one of the first plurality of beamforming weight vectors that corresponds to one of the second plurality of beamforming weight vectors that is used to generate an old beam before the mode switch is performed; and determine, based on the mode switch being a switch from the first mode to the second mode, the beamforming weight vector that is used to generate the new beam as one of the second plurality of beamforming weight vectors that corresponds to one of the first plurality of beamforming weight vectors that is used to generate the old beam before the mode switch is performed.

4. The electronic device of claim 1, wherein the processor is further configured to:

obtain a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode; and obtain a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode, wherein the first plurality of beamforming weight vectors are designed to maximize a predetermined objective while operating in the first mode, wherein the second plurality of beamforming weight vectors are designed to maximize the predetermined objective while operating in the second mode, and wherein the processor is further configured to:

determine, based on the mode switch being a switch from the second mode to the first mode, a beamforming weight vector that is used to generate the new beam as one of the first plurality of beamforming weight vectors for which a first radiation pattern of a first beam that is generated using the one of the first plurality of beamforming weight vectors has a highest similarity to a second radiation pattern of an old beam that is generated using one of the second plurality of beamforming weight vectors before the mode switch is performed; and determine, based on the mode switch being a switch from the first mode to the second mode, the beamforming weight vector that is used to generate the new beam as one of the second plurality of beamforming weight vectors for which a second radiation pattern of a second beam that is generated using the one of the second plurality of beamforming weight vectors has a highest similarity to a first radiation pattern of the old beam that is generated using one of the first plurality of beamforming weight vectors before the mode switch is performed.

5. The electronic device of claim 1, wherein the processor is further configured to:

obtain a trained first machine learning model, wherein the first machine learning model is trained using a plurality of first training feature vectors and a plurality of first training labels that each correspond to one of the plurality of first training feature vectors, wherein each of the plurality of first training feature vectors comprises signal quality values, under one first set of conditions, for each possible beam that can be formed in the first mode, and the corresponding first training label comprises a beam after the mode switch to the second mode under the one first set of conditions; and obtain a trained second machine learning model, wherein the second machine learning model is trained using a plurality of second training feature vectors and a plurality of second training labels that each correspond to one of the plurality of second training feature vectors, wherein each of the plurality of second training feature vectors comprises signal quality values, under one second set of conditions, for each possible beam that can be formed in the second mode, and the corresponding second training label comprises a beam after the mode switch to the first mode under the one second set of conditions, wherein the signal quality values for each possible beam that can be formed in the first mode and the signal quality values for each possible beam that can be formed in the second mode are obtained based on a simulation of the electronic device under different first and second sets of conditions, respectively, wherein, for the first training label, the beam after the mode switch to the second mode under the one first set of conditions is determined as a beam that has a highest signal quality value from the signal quality values for each possible beam that can be formed in the second mode under the one first set of conditions, wherein, for the second training label, the beam after the mode switch to the first mode under the one second set of conditions is determined as a beam that has a highest signal quality value from the signal quality values for each possible beam that can be formed in the first mode under the one second set of conditions, and wherein the processor is further configured to:
   after the mode switch from the first mode to the second mode, input a current set of conditions as a feature vector to the trained first machine learning model to obtain, from the first machine learning model, an output indicating the new beam to use for the communications during the first beam management cycle in the second mode; or
   after the mode switch from the second mode to the first mode, input the current set of conditions as the feature vector to the trained second machine learning model to obtain, from the second machine learning model, an output indicating the new beam to use for the communications during the first beam management cycle in the first mode.

6. The electronic device of claim 1, wherein the processor is further configured to:
   acquire, while the electronic device is in the first mode in a first previous time period, first signal quality values for each possible beam that can be formed in the first mode under one first set of conditions;
   perform, after the mode switch from the first mode to the second mode in the first previous time period, a cycle of beam management under the one first set of conditions to determine a first post-switch beam for the communications in the second mode;
   acquire, while the electronic device is in the second mode in a second previous time period, second signal quality values for each possible beam that can be formed in the second mode under one second set of conditions;
   perform, after the mode switch from the second mode to the first mode in the second previous time period, a cycle of beam management under the one second set of conditions to determine a second post-switch beam for the communications in the first mode;
   obtain a trained first machine learning model, wherein the first machine learning model is trained using at least one first training feature vector and at least one first training label that corresponds to the at least one first training feature vector, wherein the at least one first training feature vector comprises the first signal quality values, and the corresponding first training label comprises the first post-switch beam;
   obtain a trained second machine learning model, wherein the second machine learning model is trained using at least one second training feature vector and at least one second training label that corresponds to the at least one second training feature vector, wherein the at least one second training feature vector comprises the second signal quality values, and the corresponding second training label comprises the second post-switch beam; and
   after the mode switch from the first mode to the second mode, input a current set of conditions as a feature vector to the trained first machine learning model to obtain, from the first machine learning model, an output indicating the new beam to use for the communications during the first beam management cycle in the second mode; or
   after the mode switch from the second mode to the first mode, input the current set of conditions as the feature vector to the trained second machine learning model to obtain, from the second machine learning model, an output indicating the new beam to use for the communications during the first beam management cycle in the first mode.

7. The electronic device of claim 1, wherein the processor is further configured to:
   during the first beam management cycle after performing the mode switch from the first mode to the second mode, scale a transmit power of the remainder of the plurality of antennas up by a factor of $$\frac{N}{N_c};$$

and
   during the first beam management cycle after performing the mode switch from the second mode to the first mode, scale a transmit power of the remainder of the plurality of antennas down by a factor of $$\frac{N_c}{N},$$

wherein N is a total number of the plurality of antennas and $N_c$ is a number of the remainder of the plurality of antennas.

8. A method performed by an electronic device, the method comprising:
   performing a mode switch on a plurality of antenna elements to switch between operation in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming;
   determining, after the mode switch is performed, a new beam to use for the communications during a first beam management cycle after the mode switch;
   performing, using the new beam, the first beam management cycle on the plurality of antenna elements after the mode switch to obtain signal quality measurements; and
   performing at least one second beam management cycle on the plurality of antenna elements after the first beam management cycle, using an updated beam that is determined based on the signal quality measurements obtained during the first beam management cycle.

9. The method of claim 8, further comprising:
   obtaining a first beamforming weight vector that is used to generate an old beam before the mode switch is performed, wherein the first beamforming weight vector includes an entry corresponding to each one of the plurality of antenna elements, each entry comprising a weight to be applied to the corresponding one of the plurality of antenna elements;
   determining, based on the mode switch being a switch from the second mode to the first mode, a second beamforming weight vector that is used to generate the new beam as the first beamforming weight vector; and determining, based on the mode switch being a switch from the first mode to the second mode, the second beamforming weight vector that is used to generate the new beam as an element-wise product of the first beamforming weight vector with a selection vector, wherein:
- the selection vector includes an entry corresponding to each one of the plurality of antenna elements,
- entries of the selection vector that correspond to one of the plurality of antenna elements that is used for the radar in the second mode are set to 0, and
- entries of the selection vector that correspond to one of the plurality of antenna elements that is used for the communications in the second mode are set to 1.

10. The method of claim 8, further comprising:
obtaining a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode; and
obtaining a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode,
wherein the first and second pluralities of beamforming weight vectors are designed such that each one of the first plurality of beamforming weight vectors corresponds to one of the second plurality of beamforming weight vectors, and a second radiation pattern of a second beam that is generated using each one of the second plurality of beamforming weight vectors has a maximized similarity to a first radiation pattern of a first beam that is generated using the corresponding one of the first plurality of beamforming weight vectors, and
wherein the method further comprises:
- determining, based on the mode switch being a switch from the second mode to the first mode, a beamforming weight vector that is used to generate the new beam as one of the first plurality of beamforming weight vectors that corresponds to one of the second plurality of beamforming weight vectors that is used to generate an old beam before the mode switch is performed; and
- determining, based on the mode switch being a switch from the first mode to the second mode, the beamforming weight vector that is used to generate the new beam as one of the second plurality of beamforming weight vectors that corresponds to one of the first plurality of beamforming weight vectors that is used to generate the old beam before the mode switch is performed.

11. The method of claim 8, further comprising:
obtaining a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode; and
obtaining a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode,
wherein the first plurality of beamforming weight vectors are designed to maximize a predetermined objective while operating in the first mode,
wherein the second plurality of beamforming weight vectors are designed to maximize the predetermined objective while operating in the second mode, and
wherein the method further comprises:
- determining, based on the mode switch being a switch from the second mode to the first mode, a beamforming weight vector that is used to generate the new beam as one of the first plurality of beamforming weight vectors for which a first radiation pattern of a first beam that is generated using the one of the first plurality of beamforming weight vectors has a highest similarity to a second radiation pattern of an old beam that is generated using one of the second plurality of beamforming weight vectors before the mode switch is performed; and
- determining, based on the mode switch being a switch from the first mode to the second mode, the beamforming weight vector that is used to generate the new beam as one of the second plurality of beamforming weight vectors for which a second radiation pattern of a second beam that is generated using the one of the second plurality of beamforming weight vectors has a highest similarity to a first radiation pattern of the old beam that is generated using one of the first plurality of beamforming weight vectors before the mode switch is performed.

12. The method of claim 8, further comprising:
obtaining a trained first machine learning model, wherein the first machine learning model is trained using a plurality of first training feature vectors and a plurality of first training labels that each correspond to one of the plurality of first training feature vectors, wherein each of the plurality of first training feature vectors comprises signal quality values, under one first set of conditions, for each possible beam that can be formed in the first mode, and the corresponding first training label comprises a beam after the mode switch to the second mode under the one first set of conditions; and
obtaining a trained second machine learning model, wherein the second machine learning model is trained using a plurality of second training feature vectors and a plurality of second training labels that each correspond to one of the plurality of second training feature vectors, wherein each of the plurality of second training feature vectors comprises signal quality values, under one second set of conditions, for each possible beam that can be formed in the second mode, and the corresponding second training label comprises a beam after the mode switch to the first mode under the one second set of conditions,
wherein the signal quality values for each possible beam that can be formed in the first mode and the signal quality values for each possible beam that can be formed in the second mode are obtained based on a simulation of the electronic device under different first and second sets of conditions, respectively, wherein, for the first training label, the beam after the mode switch to the second mode under the one first set of conditions is determined as a beam that has a highest signal quality value from the signal quality values for each possible beam that can be formed in the second mode under the one first set of conditions, wherein, for the second training label, the beam after the mode switch to the first mode under the one second set of conditions is determined as a beam that has a highest signal quality value from the signal quality values for each possible beam that can be formed in the first mode under the one second set of conditions, and wherein the method further comprises:

after the mode switch from the first mode to the second mode, inputting a current set of conditions as a feature vector to the trained first machine learning model to obtain, from the first machine learning model, an output indicating the new beam to use for the communications during the first beam management cycle in the second mode; or after the mode switch from the second mode to the first mode, inputting the current set of conditions as the feature vector to the trained second machine learning model to obtain, from the second machine learning model, an output indicating the new beam to use for the communications during the first beam management cycle in the first mode.

13. The method of claim 8, further comprising:

acquiring, while the electronic device is in the first mode in a first previous time period, first signal quality values for each possible beam that can be formed in the first mode under one first set of conditions;

performing, after the mode switch from the first mode to the second mode in the first previous time period, a cycle of beam management under the one first set of conditions to determine a first post-switch beam for the communications in the second mode;

acquiring, while the electronic device is in the second mode in a second previous time period, second signal quality values for each possible beam that can be formed in the second mode under one second set of conditions;

performing, after the mode switch from the second mode to the first mode in the second previous time period, a cycle of beam management under the one second set of conditions to determine a second post-switch beam for the communications in the first mode;

obtaining a trained first machine learning model, wherein the first machine learning model is trained using at least one first training feature vector and at least one first training label that corresponds to the at least one first training feature vector, wherein the at least one first training feature vector comprises the first signal quality values, and the corresponding first training label comprises the first post-switch beam;

obtaining a trained second machine learning model, wherein the second machine learning model is trained using at least one second training feature vector and at least one second training label that corresponds to the at least one second training feature vector, wherein the at least one second training feature vector comprises the second signal quality values, and the corresponding second training label comprises the second post-switch beam; and after the mode switch from the first mode to the second mode, inputting a current set of conditions as a feature vector to the trained first machine learning model to obtain, from the first machine learning model, an output indicating the new beam to use for the communications during the first beam management cycle in the second mode; or after the mode switch from the second mode to the first mode, inputting the current set of conditions as the feature vector to the trained second machine learning model to obtain, from the second machine learning model, an output indicating the new beam to use for the communications during the first beam management cycle in the first mode.

14. The method of claim 8, further comprising:

during the first beam management cycle after performing the mode switch from the first mode to the second mode, scaling a transmit power of the remainder of the plurality of antennas up by a factor of $$\frac{N}{N_c};$$

and during the first beam management cycle after performing the mode switch from the second mode to the first mode, scaling a transmit power of the remainder of the plurality of antennas down by a factor of $$\frac{N_c}{N},$$

wherein N is a total number of the plurality of antennas and $N_c$ is a number of the remainder of the plurality of antennas.

15. A non-transitory computer-readable medium configured to store instructions that, when executed by a processor of an electronic device, cause the electronic device to:

perform a mode switch on a plurality of antenna elements to switch between operation in a first mode and a second mode, wherein in the first mode the plurality of antenna elements are used for communications with beamforming, and in the second mode at least two of the plurality of antenna elements are used for radar and a remainder of the plurality of antenna elements are used for the communications with beamforming;

determine, after the mode switch is performed, a new beam to use for the communications during a first beam management cycle after the mode switch;

perform, using the new beam, the first beam management cycle on the plurality of antenna elements after the mode switch to obtain signal quality measurements; and perform at least one second beam management cycle on the plurality of antenna elements after the first beam management cycle, using an updated beam that is determined based on the signal quality measurements obtained during the first beam management cycle.

16. The non-transitory computer-readable medium of claim 15, wherein the instructions, when executed by the processor, further cause the electronic device to:

obtain a first beamforming weight vector that is used to generate an old beam before the mode switch is performed, wherein the first beamforming weight vector includes an entry corresponding to each one of the plurality of antenna elements, each entry comprising a weight to be applied to the corresponding one of the plurality of antenna elements;

determine, based on the mode switch being a switch from the second mode to the first mode, a second beamforming weight vector that is used to generate the new beam as the first beamforming weight vector; and determine, based on the mode switch being a switch from the first mode to the second mode, the second beamforming weight vector that is used to generate the new beam as an element-wise product of the first beamforming weight vector with a selection vector, wherein:
the selection vector includes an entry corresponding to each one of the plurality of antenna elements,
entries of the selection vector that correspond to one of the plurality of antenna elements that is used for the radar in the second mode are set to 0, and
entries of the selection vector that correspond to one of the plurality of antenna elements that is used for the communications in the second mode are set to 1.

17. The non-transitory computer-readable medium of claim 15, wherein the instructions, when executed by the processor, further cause the electronic device to:
obtain a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode; and
obtain a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode, wherein the first and second pluralities of beamforming weight vectors are designed such that each one of the first plurality of beamforming weight vectors corresponds to one of the second plurality of beamforming weight vectors, and a second radiation pattern of a second beam that is generated using each one of the second plurality of beamforming weight vectors has a maximized similarity to a first radiation pattern of a first beam that is generated using the corresponding one of the first plurality of beamforming weight vectors;
determine, based on the mode switch being a switch from the second mode to the first mode, a beamforming weight vector that is used to generate the new beam as one of the first plurality of beamforming weight vectors that corresponds to one of the second plurality of beamforming weight vectors that is used to generate an old beam before the mode switch is performed; and
determine, based on the mode switch being a switch from the first mode to the second mode, the beamforming weight vector that is used to generate the new beam as one of the second plurality of beamforming weight vectors that corresponds to one of the first plurality of beamforming weight vectors that is used to generate the old beam before the mode switch is performed.

18. The non-transitory computer-readable medium of claim 15, wherein the instructions, when executed by the processor, further cause the electronic device to:
obtain a first plurality of beamforming weight vectors for operation of the plurality of antenna elements in the first mode, wherein each of the first plurality of beamforming weight vectors includes an entry corresponding to each one of the plurality of antenna elements, each entry comprising a weight to be applied to the corresponding one of the plurality of antenna elements in the first mode;
obtain a second plurality of beamforming weight vectors for operation of the plurality of antenna elements in the second mode, wherein each of the second plurality of beamforming weight vectors includes an entry corresponding to each one of the plurality of antenna elements, each entry comprising a weight to be applied to the corresponding one of the plurality of antenna elements in the second mode, wherein the first plurality of beamforming weight vectors are designed to maximize a predetermined objective while operating in the first mode and wherein the second plurality of beamforming weight vectors are designed to maximize the predetermined objective while operating in the second mode;
determine, based on the mode switch being a switch from the second mode to the first mode, a beamforming weight vector that is used to generate the new beam as one of the first plurality of beamforming weight vectors for which a first radiation pattern of a first beam that is generated using the one of the first plurality of beamforming weight vectors has a highest similarity to a second radiation pattern of an old beam that is generated using one of the second plurality of beamforming weight vectors before the mode switch is performed; and
determine, based on the mode switch being a switch from the first mode to the second mode, the beamforming weight vector that is used to generate the new beam as one of the second plurality of beamforming weight vectors for which a second radiation pattern of a second beam that is generated using the one of the second plurality of beamforming weight vectors has a highest similarity to a first radiation pattern of the old beam that is generated using one of the first plurality of beamforming weight vectors before the mode switch is performed.

19. The non-transitory computer-readable medium of claim 15, wherein the instructions, when executed by the processor, further cause the electronic device to:
obtain a trained first machine learning model, wherein the first machine learning model is trained using a plurality of first training feature vectors and a plurality of first training labels that each correspond to one of the plurality of first training feature vectors, wherein each of the plurality of first training feature vectors comprises signal quality values, under one first set of conditions, for each possible beam that can be formed in the first mode, and the corresponding first training label comprises a beam after the mode switch to the second mode under the one first set of conditions; and
obtain a trained second machine learning model, wherein the second machine learning model is trained using a plurality of second training feature vectors and a plurality of second training labels that each correspond to one of the plurality of second training feature vectors, wherein each of the plurality of second training feature vectors comprises signal quality values, under one second set of conditions, for each possible beam that can be formed in the second mode, and the corresponding second training label comprises a beam after the mode switch to the first mode under the one second set of conditions, wherein the signal quality values for each possible beam that can be formed in the first mode and the signal quality values for each possible beam that can be formed in the second mode are obtained based on a simulation of the electronic device under different first and second sets of conditions, respectively, or are acquired by the electronic device under different first and second sets of conditions during first and second previous time periods, respectively, wherein, for the first training label, the beam after the mode switch to the second mode under the one first set of conditions is determined as a beam that has a highest signal quality value from the signal quality values for each possible beam that can be formed in the second mode under the one first set of conditions based on the simulation of the electronic device, or is determined as a first post-switch beam for the communications in the second mode based on a cycle of beam management under the one first set of conditions in the first previous time period;

wherein, for the second training label, the beam after the mode switch to the first mode under the one second set of conditions is determined as a beam that has a highest signal quality value from the signal quality values for each possible beam that can be formed in the first mode under the one second set of conditions based on the simulation of the electronic device, or is determined as a second post-switch beam for the communications in the first mode based on a cycle of beam management under the one second set of conditions in the second previous time period, and wherein the instructions, when executed by the processor, further cause the electronic device to:
after the mode switch from the first mode to the second mode, input a current set of conditions as a feature vector to the trained first machine learning model to obtain, from the first machine learning model, an output indicating the new beam to use for the communications during the first beam management cycle in the second mode; or after the mode switch from the second mode to the first mode, input the current set of conditions as the feature vector to the trained second machine learning model to obtain, from the second machine learning model, an output indicating the new beam to use for the communications during the first beam management cycle in the first mode.

20. The non-transitory computer-readable medium of claim 15, wherein the instructions, when executed by the processor, further cause the electronic device to:

during the first beam management cycle after performing the mode switch from the first mode to the second mode, scale a transmit power of the remainder of the plurality of antennas up by a factor of $$\frac{N}{N_c};$$

and during the first beam management cycle after performing the mode switch from the second mode to the first mode, scale a transmit power of the remainder of the plurality of antennas down by a factor of $$\frac{N_c}{N},$$

wherein N is a total number of the plurality of antennas and $N_c$ is a number of the remainder of the plurality of antennas.

* * * * *